(12) United States Patent
Taguchi et al.

(10) Patent No.: US 7,113,339 B2
(45) Date of Patent: Sep. 26, 2006

(54) INTERFEROMETRIC MODULATOR AND DISPLAY UNIT

(75) Inventors: Tokio Taguchi, Tenri (JP); Shun Ueki, Nara (JP); Kazuhiko Tsuda, Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 19 days.

(21) Appl. No.: 10/928,833

(22) Filed: Aug. 27, 2004

(65) Prior Publication Data

US 2005/0046919 A1 Mar. 3, 2005

(30) Foreign Application Priority Data

Aug. 29, 2003 (JP) ............... 2003-307734

(51) Int. Cl.
*G02B 1/10* (2006.01)
*G02B 26/08* (2006.01)

(52) U.S. Cl. ............... 359/586; 359/579; 359/587; 359/589; 359/298; 359/302; 359/318; 359/290; 359/291; 359/292; 359/295

(58) Field of Classification Search ............... 359/579, 359/578, 584, 586–589, 290–292, 295, 298, 359/302, 318
See application file for complete search history.

(56) References Cited

U.S. PATENT DOCUMENTS

| | | | |
|---|---|---|---|
| 5,500,761 A * | 3/1996 | Goossen et al. | 359/290 |
| 5,589,974 A * | 12/1996 | Goossen et al. | 359/290 |
| 5,710,656 A * | 1/1998 | Goossen | 359/291 |
| 5,825,528 A * | 10/1998 | Goossen | 359/291 |
| 5,835,255 A | 11/1998 | Miles | |
| 5,838,484 A * | 11/1998 | Goossen | 359/282 |
| 5,949,571 A * | 9/1999 | Goossen et al. | 359/291 |
| 6,055,090 A * | 4/2000 | Miles | 359/291 |
| 6,141,139 A * | 10/2000 | Furlani et al. | 359/280 |
| 6,337,753 B1 * | 1/2002 | Goossen | 398/79 |
| 6,424,450 B1 * | 7/2002 | Goossen | 359/290 |
| 6,519,073 B1 * | 2/2003 | Goossen | 359/290 |
| 6,590,710 B1 * | 7/2003 | Hara et al. | 359/579 |
| 6,643,052 B1 * | 11/2003 | Goossen | 359/290 |
| 6,650,455 B1 | 11/2003 | Miles | |
| 6,674,562 B1 | 1/2004 | Miles | |

FOREIGN PATENT DOCUMENTS

WO WO 97/17628 5/1997

* cited by examiner

*Primary Examiner*—Evelyn A. Lester
(74) *Attorney, Agent, or Firm*—Keating & Bennett, LLP

(57) ABSTRACT

The interferometric modulator of the invention includes a transparent substrate (refractive index: $n_0$) 12, an optical thin film (complex index of refraction: $N_1=n_1-i \cdot k_1$) 13 provided on the transparent substrate 12, and an absorber layer (complex index of refraction: $N_s=n_s-i \cdot k_s$) 14 opposed to the optical thin film 13, the distance of a gap to the optical thin film 13 being variable, wherein the relation $n_1 > n_0$, $k_1 \cong 0$ and $n_s > n_0$ is satisfied.

37 Claims, 9 Drawing Sheets

INTERFEROMETRIC MODULATOR AND DISPLAY UNIT

BACKGROUND OF THE INVENTION

1. Field of the Invention

The present invention relates to an interferometric modulator and a display unit with the interferometric modulator, and more particularly to an interferometric modulator that is suitably employed for a reflection type display unit.

2. Description of the Related Art

Generally, the reflection type display unit employs the ambient light, and is particularly useful for the mobile purposes.

Currently, the typical reflection type display units are employed in a TN (Twisted Nematic) mode or an STN (Super-Twisted Nematic) mode using the birefringence or optical rotatory power of the liquid crystal.

However, in these display modes, it is required to use a polarizing plate, in which an optical loss by the polarizing plate is as large as about 60%, so that the display is darker.

On the other hand, a guest-host method in which dichroic dye is added to liquid crystal and a transmitting/scattering method represented by a dynamic scattering mode have been proposed as the liquid crystal display method without using the polarizing plate. However, these display methods have lower contrast and are impractical. An electrophoresis method of color particles in a solution, a dichroic rotary particle (twisted ball) method, and a toner display method have been proposed as the display method using other than the liquid crystal, but have not been put to practical use because of the problems with the driving voltage, contrast, response speed, stability and life.

In recent years, a new display method without using the polarizing plate, called an iMod™ method, in which interference of incident light is modulated by driving of a micro machine (Micro Electro Mechanical System: MEMS), has been disclosed in U.S. Pat. No. 5,835,255 and Japanese National Phase Publication No. 2000-500245. This method is a reflection type display system for modulating interference of an ambient light by changing electrostatically the spacing of a cavity (interferometric modulator cavity) having two walls, one being a reflector (metal) and the other being an induction absorber (metallic absorber sandwiched between dielectrics). In this system, a monochrome display with red (R), green (G) or blue (B) and a black display can be switched. That is, light of a wavelength corresponding to the optical distance is reflected to the observer in a state where the reflector and the induction absorber are separated apart by a specified optical distance, based on a Fabry-Pérot interference principle, and displayed in monochrome. Also, incindet light in a visible radiation region is prevented (absorbed) from being reflected by adjusting this optical distance, and displayed in black.

This system has an advantage that CF is unnecessary because of monochrome display by interference. Also, it has advantages such as a high contract ratio, a low consumption power, and a high speed response of MEMS. Furthermore, this system makes it possible to omit TFT by effectively using a hysteresis of MEMS.

However, since the bright display with the iMoD™ method is "monochrome display" using optical interference, there is a great dependence on the angle of incidence, causing a chromatic aberration depending on the viewing angle. To reduce or remove this chromatic aberration, an auxiliary front lighting and an optical compensation mechanism are required. Moreover, a color display has a laser-like color tone with a specific wavelength as the center. On the other hand, the white display is limited by a bandwidth (e.g., FWHM) of interference reflection of each color, because each pixel of RGB is realized by additive color mixture, whereby the Y value of the white display is difficult to increase. This is less preferable in the respect of application to the electronic books specific to the white/black display. Also, it is necessary to fabricate a pixel having a different structure for each display color. Moreover, with this iMoD™ method, a binary display of bright and darkness is made, and a half tone display is only possible by using a spatial dithering (area gradation method) based on the pulse width modulation, resulting in a large load.

SUMMARY OF THE INVENTION

This invention has been achieved in the light of the above problems, and it is an object of the invention to provide an interferometric modulator that can be suitably employed for a reflection type display unit.

According to a first aspect of the invention, there is provided an interferometric modulator including a transparent substrate (refractive index: $n_0$), an optical thin film (complex index of refraction: $N_1=n_1-i \cdot k_1$) provided on the transparent substrate, and an absorber layer (complex index of refraction: $N_s=n_s-i \cdot k_s$) opposed to the optical thin film, the distance of a gap to the optical thin film being variable, wherein the relation $n_1 > n_0$, $k_1 \cong 0$ and $n_s > n_0$ is satisfied. It is preferable that $n_1$ is greater than 2.0.

In an embodiment, the following expression (1) is satisfied, $$n_1 \cong \left( n_0 n_s + \frac{n_0 k_s^2}{n_s - n_0} \right)^{1/2} \qquad (1)$$

In another embodiment, for a wavelength λ in a visible radiation region, a physical film thickness $d_1$ of the optical thin film satisfies the following expression (2), when $n_1^2 - n_s^2 - k_s^2 > 0$, $$d_1 \cong \frac{\lambda}{2n_1} \left\{ j - \frac{1}{2\pi} \tan^{-1} \left( \frac{-2n_1 k_s}{n_1^2 - n_s^2 - k_s^2} \right) \right\} \quad j: \text{integer} \qquad (2)$$

or satisfies the following expression (3), when $n_1^2 - n_s^2 - k_s^2 < 0$, $$d_1 \cong \frac{\lambda}{2n_1} \left\{ \left( j + \frac{1}{2} \right) - \frac{1}{2\pi} \tan^{-1} \left( \frac{-2n_1 k_s}{n_1^2 - n_s^2 - k_s^2} \right) \right\} \quad j: \text{integer} \qquad (3)$$

In another embodiment, $d_1$ is the smallest value in which the expression (2) or (3) is satisfied.

In another embodiment, the refractive index $n_v$ of a medium filling a gap formed between the optical thin film and the absorber layer is smaller than the refractive index $n_1$ of the optical thin film, and assuming that a physical distance of the gap is $d_v$, for wavelength λ in the visible radiation region, the following expression (4) is satisfied, $$d_v \cong \frac{(2m+1)\lambda}{4 \cdot n_v} \quad m: \text{integer} \qquad (4)$$

In another embodiment, the optical thin film is composed of an equivalent multilayer film.

According to a second aspect of the invention, there is provided an interferometric modulator including a transparent substrate (refractive index: $\eta_0$), a stacked-layer film provided on the transparent substrate, and an absorber layer (complex index of refraction: $\eta_s = n_s - i \cdot k_s$) opposed to the stacked-layer film, the distance of a gap to the stacked-layer film being variable, wherein assuming that the stacked-layer film has three or more transparent thin film layers, the complex indexes of refraction of two adjacent transparent thin film layers being mutually different, the complex index of refraction of the j-th thin film layer from the side nearest to the transparent substrate is $\eta_j = n_j - i \cdot k_j$, the phase film thickness is $\delta_j$, and B and C are given by the following expression (5), $$\begin{pmatrix} B \\ C \end{pmatrix} = \left( \prod_{j=1}^{M} \begin{pmatrix} \cos \delta_j & i \cdot \sin(\delta_j)/\eta_j \\ i \cdot \eta_j \cdot \sin(\delta_j) & \cos(\delta_j) \end{pmatrix} \right) \begin{pmatrix} 1 \\ \eta_s \end{pmatrix} \qquad (5)$$

$k_j \cong 0$, and in a visible wavelength region (380 nm<$\lambda$<780 nm), the following expression (6) is satisfied, $$\left( \frac{\eta_0 \cdot B - C}{\eta_0 \cdot B + C} \right) \left( \frac{\eta_0 \cdot B - C}{\eta_0 \cdot B + C} \right)^* < \left( \frac{\eta_0 - \eta_s}{\eta_0 + \eta_s} \right) \left( \frac{\eta_0 - \eta_s}{\eta_0 + \eta_s} \right)^* \qquad (6)$$

(∗ complex conjugate)

In another embodiment, assuming that the refractive index of a medium filling the gap formed between the stacked-layer film and the absorber layer is $\eta_v$, a physical distance of the gap is $\delta_v$, and D and E are given by the following expression (7), $$\begin{pmatrix} D \\ E \end{pmatrix} = \left\{ \prod_{j=1}^{M} \begin{pmatrix} \cos \delta_j & i \cdot \sin(\delta_j)/\eta_j \\ i \cdot \eta_j \cdot \sin(\delta_j) & \cos(\delta_j) \end{pmatrix} \right\} \begin{pmatrix} \cos \delta_v & i \cdot \sin(\delta_v)/\eta_v \\ i \cdot \eta_v \cdot \sin(\delta_v) & \cos(\delta_v) \end{pmatrix} \begin{pmatrix} 1 \\ \eta_s \end{pmatrix} \qquad (7)$$

in a visible wavelength region (380 nm<$\lambda$<780 nm) of wide band, the following expression (8) is satisfied, $$\left( \frac{\eta_0 \cdot D - E}{\eta_0 \cdot D + E} \right) \left( \frac{\eta_0 \cdot D - E}{\eta_0 \cdot D + E} \right)^* > \left( \frac{\eta_0 - \eta_s}{\eta_0 + \eta_s} \right) \left( \frac{\eta_0 - \eta_s}{\eta_0 + \eta_s} \right)^* \qquad (8)$$

(∗ complex conjugate)

In another embodiment, the stacked-layer film has an alternate stacked-layer film in which a first transparent thin film layer and a second transparent thin film layer having mutually different complex indexes of refraction are stacked alternately, and a third transparent thin film layer provided on the alternate stacked-layer film and opposed to the absorber layer.

In another embodiment, the distance of the gap formed between the optical thin film or the stacked-layer film and the absorber layer is changed within an interferometric range.

In another embodiment, the distance of the gap formed between the optical thin film or the stacked-layer film and the absorber layer is changed up to the optical distance at which no interference occurs.

In another embodiment, the gap formed between the optical thin film or the stacked-layer film and the absorber layer is changed stepwise.

In another embodiment, the interferometric modulator further includes a driving element for changing the distance of the gap formed between the optical thin film or the stacked-layer film and the absorber layer.

In another embodiment, the driving element includes a piezoelectric element.

In another embodiment, the gap formed between the optical thin film or the stacked-layer film and the absorber layer is vacuum or filled with gas.

In another embodiment, the gap formed between the optical thin film or the stacked-layer film and the absorber layer is filled with liquid.

In another embodiment, the interferometric modulator further includes a color filter for passing light having a specific wavelength.

In another embodiment, the interferometric modulator further includes a light scattering layer.

In another embodiment, the optical thin film or the stacked-layer film includes at least one transparent conductive layer.

In another embodiment, the distance of the gap formed between the optical thin film or the stacked-layer film and the absorber layer is changed in accordance with a voltage applied to the at least one transparent conductive layer.

A display unit of the invention has a plurality of pixels, each of which includes the interferometric modulator according to any one of the above embodiments.

In another embodiment, the plurality of pixels include a first pixel and a second pixel, in which the interferometric modulators provided for the first pixel and the second pixel are mutually different in the configuration of the optical thin film, the stacked-layer film or the absorber layer.

In the interferometric modulator of this invention, the reflectance of light incident from the transparent substrate side is controlled by adjusting the gap length between the optical thin film or stacked film provided on the transparent substrate and the absorber layer. A basic design concept of the interferometric modulator according to the first aspect of the invention is to employ the optical thin film acting as the anti-reflection film (i.e., reflection reducing film) and/or reflection enhancement film most effectively for the wavelength (e.g., 550 nm) in the visible wavelength region. On the other hand, a basic design concept of the interferometric modulator according to the second aspect of the invention is to employ the stacked film capable of achieving the anti-reflection film and/or reflection enhancement film for any wavelength in the visible wavelength region, namely, in the wide band. In either case, the optical thin film or stacked film constructed to become the anti-reflection film when contacted with the absorber layer acts as the reflection enhancement film by forming a predetermined distance of the gap (e.g., air layer) to the absorber layer. Accordingly, the interferometric modulator of the invention provides a higher reflectance and a higher contrast ratio than the conventional interferometric modulator of the iMoD™ method based on the Fabry-Pérot interference. Also, by employing the interferometric modulator of the invention, the reflection type display unit having high brightness and high contrast ratio is produced.

BRIEF DESCRIPTION OF THE DRAWINGS

FIGS. 6A and 6B are graphs representing the spectral reflectance characteristic when the gap distance is changed from 0 nm to 280 nm in the reflection type display unit 10, in which FIG. 6A is in a first minimum condition and FIG. 6B is in a second minimum condition.

FIGS. 8A and 8B are graphs representing the spectral reflectance characteristic when the gap distance is changed from 0 nm to 280 nm in the reflection type display unit 30, in which FIG. 8A is in a first minimum condition and FIG. 8B is in a second minimum condition.

FIGS. 10A and 10B are graphs representing the spectral reflectance characteristic when the gap distance is changed from 0 nm to 280 nm in the reflection type display unit 50, in which FIG. 10A is in a first minimum condition and FIG. 10B is in a second minimum condition.

DETAILED DESCRIPTION OF THE PREFERRED EMBODIMENTS

The configuration and operation of an interferometric modulator according to an embodiment of the present invention will be described below with reference to the drawings. However, this invention is not limited to these embodiments.

Figure 1:
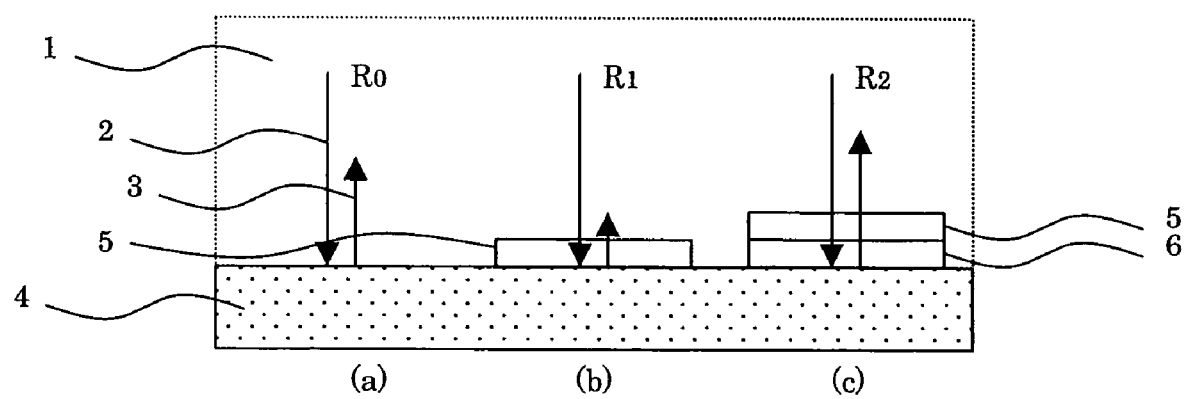
FIG. 1 is a schematic view for explaining a basic configuration and an operation principle of an interferometric modulator according to an embodiment of the present invention.

Referring to FIG. 1, the basic configuration and the operation principle of the interferometric modulator according to a first embodiment of the invention will be firstly described.

The interferometric modulator of the invention includes a transparent substrate (refractive index: $n_0$), an optical thin film (complex index of refraction: $N_1=n_1-i \cdot k_1$) provided on the transparent substrate, and an absorber layer (complex index of refraction: $N_s=n_s-i \cdot k_s$) opposed to the optical thin film, the distance of a gap to the optical thin film being variable, wherein the relation $n_1>n_0$, $k_1 \cong 0$ and $n_s>n_0$ is satisfied. This optical thin film acts to reduce (prevent) or increase the reflection in accordance with the distance of the gap to the absorber layer. For example, when the optical thin film is contacted with the absorber layer, it acts as a anti-reflection film, and when an air layer having a predetermined distance to the absorber layer is formed, it acts as a reflection enhancement film.

Generally, it is known that the thin film having a film thickness smaller than the wavelength of light has various properties specific to the thin film other than the light reflection and refraction. Various properties of the optical thin film are applied in the coating of a so-called optical multilayer film, such as the anti-reflection film (nonreflective coating) on the glass surface, high reflection film for abeam splitter or reflector, and various kinds of optical filter. Besides, they are utilized in various fields of thin film optical circuit elements such as light waveguide, and light receiving/emitting elements using semiconductor thin film.

Various thin film materials are employed in these optical applications, but largely classified into a transparent body (insulator and semiconductor having a wavelength greater than the absorption end) and a light absorber (metal (including alloy), semiconductor having a wavelength below the absorption end) optically. The kinds of material are divided into dielectrics, metals and semiconductors. The optical properties of these thin film materials are typically represented uniquely by its optical constant $N=n-i \cdot k$ (complex index of refraction: refractive index n, extinction coefficient k) and the physical film thickness d or phase film thickness $\delta=2\pi \cdot N \cdot d \cdot \cos \theta/\lambda$ ($\theta$ is an angle of incidence, $\lambda$ is a wavelength of incident light), whereby the properties of optical multilayer film with optical thin films stacked are decided by each optical constant and each film thickness of a plurality of layers composing the optical multilayer film. Accordingly, the optical constant (complex index of refraction) $N=n-i \cdot k$ that is a quantity indicating the optical property of the thin film is particularly important.

For example, as shown in (a) of FIG. 1, the refraction factor (intensity ratio of incident light 2 to reflected light 3) $R_0$ of an ambient light when being incident vertically on a substrate 4 composed of an absorber having a complex index of refraction $N_s=n_s-i \cdot k_s$ from a transparent medium (incidence medium) 1 having refractive index $n_0$ is represented by the following expression (1-1).

$$R_0 = \left|\frac{n_0 - (n_s - i \cdot k_s)}{n_0 + (n_s - i \cdot k_s)}\right|^2 \quad (1\text{-}1)$$

Herein, in the case where the transparent medium 1 is the air ($n_0 = 1$) and the absorber substrate 4 is tungsten W ($n_s = 3.5$, $k_s = 2.73$, $\lambda = 551$ nm), $R_0$ is equal to 49.46%.

Then, if a first transparent body thin film 5 having refractive index $n_1$ and physical film thickness $d_1$ is formed on the absorber substrate 4, as shown in (b) of FIG. 1, assuming that the phase film thickness is $\delta_1 = 2\pi n_1 d_1 / \lambda$ in the vertical incidence, the reflectance $R_1$ is represented by the following expression (1-2).

$$R_1 = \left|\frac{n_0 - \dfrac{i \cdot n_1 \cdot \sin(\delta_1) + \cos(\delta_1) \cdot (n_s - i \cdot k_s)}{\cos(\delta_1) + i\dfrac{\sin(\delta_1)}{n_1}(n_s - i \cdot k_s)}}{n_0 + \dfrac{i \cdot n_1 \cdot \sin(\delta_1) + \cos(\delta_1) \cdot (n_s - i \cdot k_s)}{\cos(\delta_1) + i\dfrac{\sin(\delta_1)}{n_1}(n_s - i \cdot k_s)}}\right|^2 \quad (1\text{-}2)$$

Figure 2A:
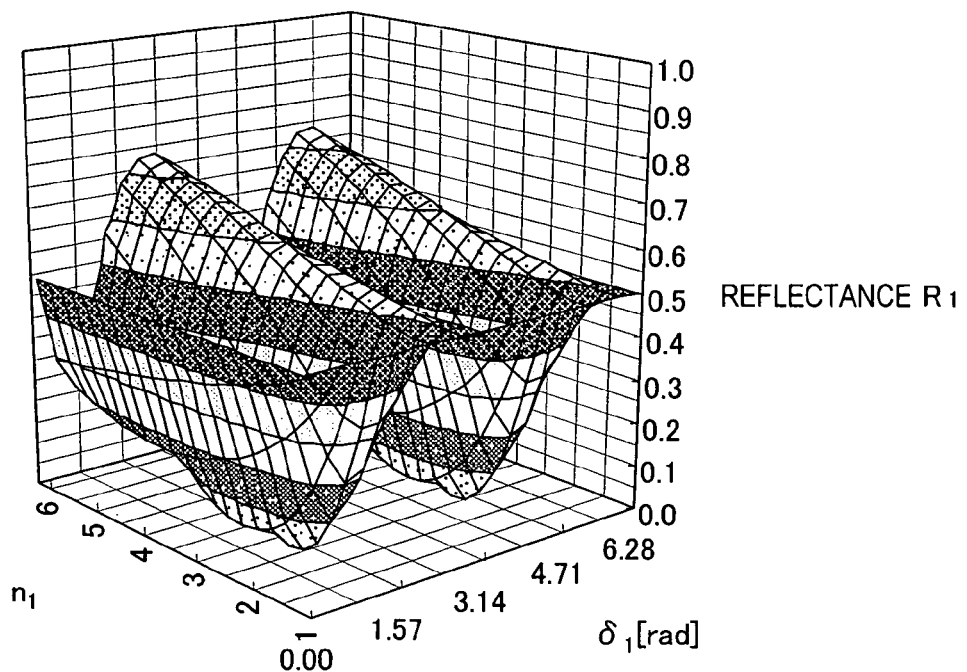
FIG. 2A is a view showing how the reflectance $R_1$ is changed depending on the refractive index $n_1$ and the phase film thickness $\delta_1$ in the basic configuration as shown in (b) of FIG. 1.

At this time, the reflectance $R_1$ is changed depending on the refractive index $n_1$ and the phase film thickness $\delta_1$, as shown in FIG. 2A, whereby a full reflection prevention is performed for the specific refractive index $n_1$ and phase film thickness $\delta_1$ at wavelength $\lambda = 551$ nm. When the anti-reflection film is formed using a transparent thin film for the transparent substrate, the increased transmittance is meant, because of the relation reflectance+transmittance=1. However, when the anti-reflection film is formed using the transparent thin film for the absorber such as metal, the increased light absorption ratio of the absorber is meant.

When a second transparent body thin film 6 having refractive index $n_2$ and phase film thickness $\delta_2$ is provided between the absorber substrate 4 and a first transparent body thin film 5, as shown in (c) of FIG. 1, the reflectance $R_2$ is represented by the following expression (1-3).

$$R_2 = \left|\frac{n_0 - \dfrac{\begin{array}{l}i \cdot n_1 \cdot \sin(\delta_1) \cdot \cos(\delta_2) + i \cdot \cos(\delta_1) \cdot n_2 \cdot \sin(\delta_2) + \\ \left(-n_1 \cdot \sin(\delta_1) \cdot \dfrac{\sin(\delta_2)}{n_2} + \cos(\delta_1) \cdot \cos(\delta_2)\right) \cdot (n_s - i \cdot k_s)\end{array}}{\cos(\delta_1)\cos(\delta_2) - \dfrac{\sin(\delta_1)}{n_1} \cdot n_2 \cdot \sin(\delta_2) + \left(i \cdot \cos(\delta_1) \cdot \dfrac{\sin(\delta_2)}{n_2} + i \cdot \dfrac{\sin(\delta_1)}{n_1} \cdot \cos(\delta_2)\right) \cdot (n_s - i \cdot k_s)}}{n_0 + \dfrac{\begin{array}{l}i \cdot n_1 \cdot \sin(\delta_1) \cdot \cos(\delta_2) + i \cdot \cos(\delta_1) \cdot n_2 \cdot \sin(\delta_2) + \\ \left(-n_1 \cdot \sin(\delta_1) \cdot \dfrac{\sin(\delta_2)}{n_2} + \cos(\delta_1) \cdot \cos(\delta_2)\right) \cdot (n_s - i \cdot k_s)\end{array}}{\cos(\delta_1)\cos(\delta_2) - \dfrac{\sin(\delta_1)}{n_1} \cdot n_2 \cdot \sin(\delta_2) + \left(i \cdot \cos(\delta_1) \cdot \dfrac{\sin(\delta_2)}{n_2} + i \cdot \dfrac{\sin(\delta_1)}{n_1} \cdot \cos(\delta_2)\right) \cdot (n_s - i \cdot k_s)}}\right|^2 \quad (1\text{-}3)$$

Figure 2B:
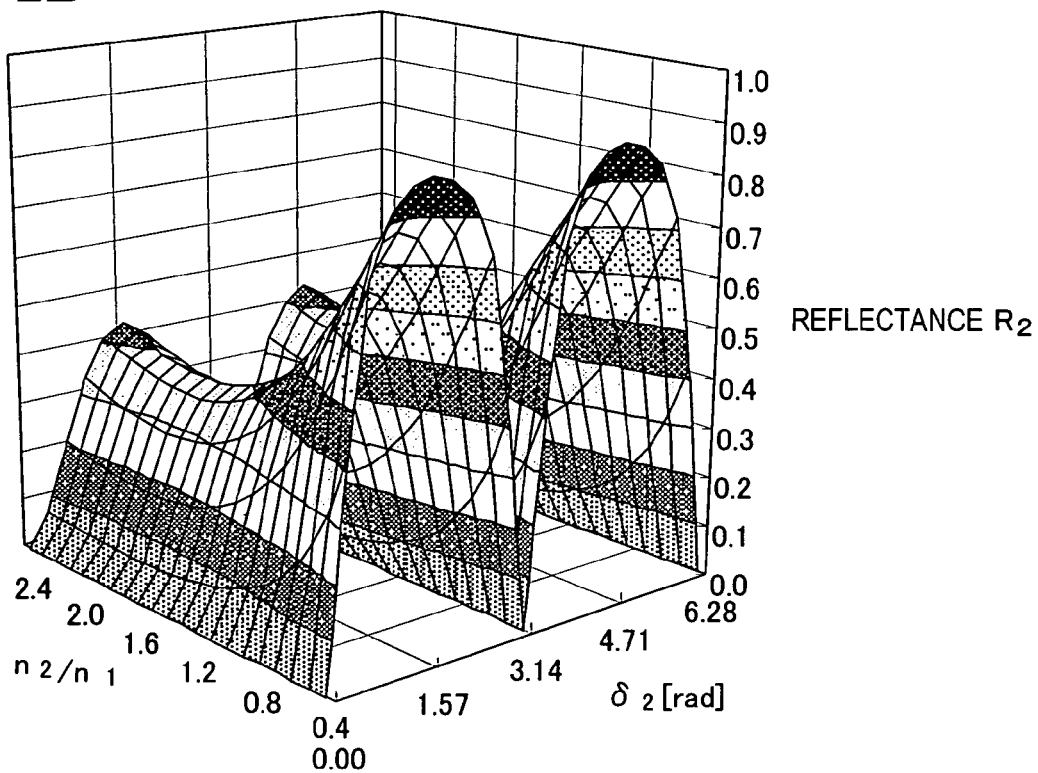
FIG. 2B is a view showing how the reflectance $R_2$ is changed depending on the refractive index ratio $n_2/n_1$ and the phase film thickness $\delta_2$ in the basic configuration as shown in (c) of FIG. 1.

At this time, the reflectance $R_2$ is changed depending on the refractive index $n_2$ and the phase film thickness $\delta_2$ of the second transparent body thin film 6, as shown in FIG. 2B. FIG. 2B shows a case where the first transparent body thin film 5 satisfies the above reflection preventing condition (expression (1-2)). If the refractive index $n_2$ of the second transparent body thin film 6 is smaller than the refractive index $n_1$ of the first transparent body thin film 5, and the phase film thickness $\delta_2$ of the second transparent body thin film 6 is within a specific range, the reflectance is greater than where there is the absorber substrate 4 alone ((a) of FIG. 1) ($R_2 > R_0$).

As will be seen from FIG. 2B, as the refractive index ratio $n_1/n_2$ is greater, the reflection increasing effect is more significant. Accordingly, to acquire the maximum reflectance, it is preferable that the first transparent body thin film 5 has the refractive index ($n_1$) as high as possible, and the second transparent body thin film 6 has the refractive index ($n_2$) as low as possible. It is preferable that the refractive index ($n_1$) of the first transparent body thin film 5 is 2.0 or greater. Also, as will be seen from FIG. 2B, the reflectance (i.e., intensity of reflected light) can be modulated by changing the phase film thickness $\delta_2$ of the second transparent body thin film 6.

An interferometric modulator according to a second aspect of the invention employs a stacked-layer film constructed to have the reflection reducing effect and/or reflection increasing effect in a visible wavelength region (380 nm<$\lambda$<780 nm), instead of the optical thin film constructed to act as the anti-reflection film and/or reflection enhancement film for the light having specific wavelength.

The reflection increasing effect is the increase in the reflectance due to optical interference. However, the effect of acquiring the higher reflectance by using the multiple reflection than the absorber simple substance, when the thick film is contained in the optical system, is also referred to as the reflection increasing effect.

The expressions (1-1) to (1-3) are well known in the field of thin film optics, and other expressions (1) to (8) as given in this specification are easily derived by those skilled in the art, whereby these expressions are not derived here. For the way of deriving these expressions, refer to Sadashi Yoshida et. al., "Thin-film Optical Device," Tokyo University Shuppankai, for example.

The interferometric modulator according to the embodiment of the invention is based on the above principle.

The preferred embodiments of the reflection type display unit using the interferometric modulator will be described below, but the interferometric modulator of the invention may be applied to the other uses than the reflection type display unit.

(Embodiment 1)

Figure 3:
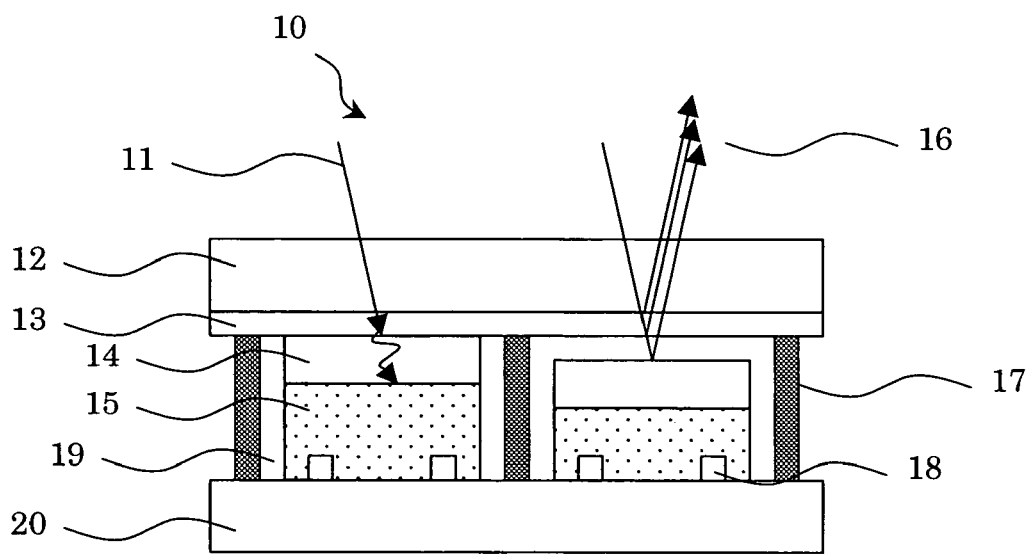
FIG. 3 is a schematic view showing the configuration of a reflection type display unit 10 according to an embodiment 1 of the invention.

FIG. 3 is a schematic view showing the configuration of a reflection type display unit 10 according to a first embodiment of the invention. The reflection type display unit 10 has a plurality of interferometric modulators arranged like a matrix, in which each interferometric modulator constitutes a pixel, for example. FIG. 3 shows two pixels of the reflection type display unit, namely, two interferometric modulators, in which the left interferometric modulator is in a black display state (a state with the smallest reflectance) and the right interferometric modulator is in a white display state (a state with the largest reflectance).

Each of the interferometric modulators making up the reflection type display unit 10 includes a transparent substrate 12, an optical thin film 13 provided on the transparent substrate 12, and an absorber layer 14 having the variable distance of a gap to the optical thin film 13.

The absorber layer 14 is formed on a driving element 15 provided on a substrate 20. The substrate 20 and the transparent substrate 12 (herein the optical thin film 13 formed on the transparent substrate 12) are spaced at a predetermined spacing and fixed by the spacer walls 17. The spacer walls 17 enclose a medium 19 filling a gap formed between the absorber layer 14 and the optical thin film 13. Though each pixel (interferometric modulator) is separated by the spacer walls 17 here, for example, the spacer walls 17 may be provided to surround a plurality of pixels. When a cross talk phenomenon is induced between adjacent pixels, such as when the absorber layer 14 is composed of absorber powder responsive to the external field (embodiment 4), it is preferable that the spacer walls 17 are provided to separate each pixel.

As the driving element 15 for changing the distance of the gap between the absorber layer 14 and the optical thin film 13, a piezoelectric element 15 is employed here. The piezoelectric element 15 produces a volume change in accordance with a voltage supplied to an electrode 18, so that the distance of the gap (separation distance) between the absorber layer 14 and the optical thin film 13 is changed. Herein, when the absorber layer 14 and the optical thin film 13 are in contact, the distance (separation distance) of the gap is represented as 0 nm.

The driving element 15 is not limited to the piezoelectric element, but may be any other element as far as it can change the separation distance between the absorber layer 14 and the optical thin film 13 in response to an external field of at least one of electric field, magnetic field, pressure, sound wave, electromagnetic wave (light), and heat. However, the driving element that can be electrically controlled under the electric field is easy to fabricate, and very beneficial in terms of display quality, cost and consumption energy. Also, in the case where the driving element has a memory property holding the state after stopping the application of voltage, no active element for holding the voltage is necessary, and a simple matrix structure may be employed. Thereby, the manufacturing cost is reduced. Also, when the absorber layer having no memory property is employed, the active element for holding the pixels is required, in which it is preferable to employ an active matrix structure.

When the absorber layer 14 and the optical thin film 13 are in contact, the optical thin film 13 functions as the anti-reflection film for the absorber layer 14, so that incindet light 11 is absorbed into the absorber layer 14, as indicated as a left pixel in FIG. 3. On the other hand, when the absorber layer 14 and the optical thin film 13 form a gap with a predetermined distance, most of the incident light is reflected due to the reflection increasing effect, as indicated as a right pixel in FIG. 3 (reflected light 16).

First of all, the conditions for acquiring the black display state as shown to the left in FIG. 3 will be described below. Herein, it is assumed that the refractive index of the transparent substrate 12 is $n_0$, the complex index of refraction $N_1$ of the optical thin film 13 is $n_1 - i \cdot k_1$, and the complex index of refraction $N_s$ of the absorber layer 14 is $n_s - i \cdot k_s$.

Figure 4:
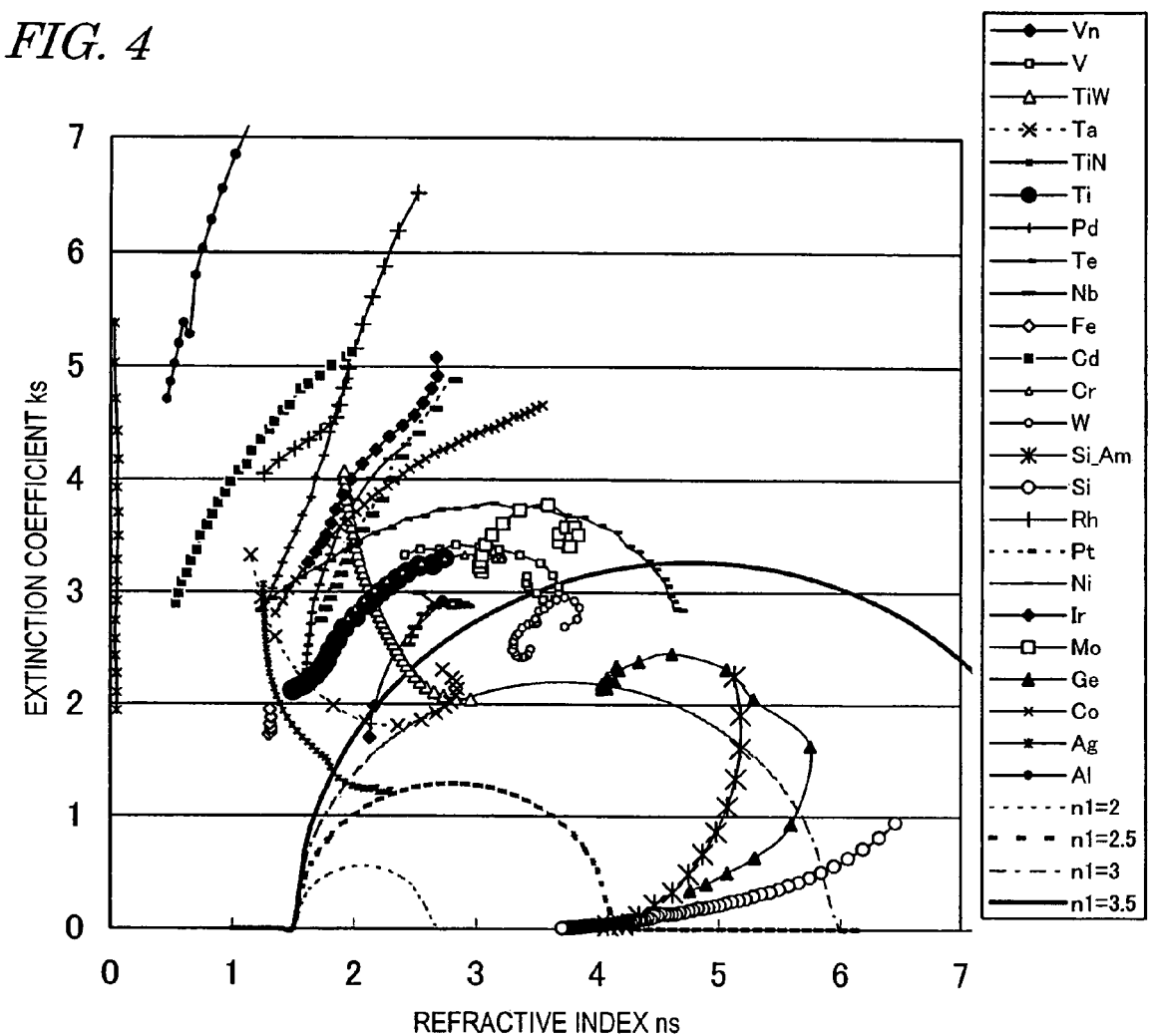
FIG. 4 is a graph representing the complex index of refraction of an absorber (metal, semiconductor).

Referring now to FIG. 4, the optical characteristics of the absorber layer 14 will be described below. FIG. 4 shows the refractive index $n_s$ and the extinction factor $k_s$ for various kinds of absorbers (metal and semiconductor) with light in the visible radiation area. The wavelength region for plotting is different with the element, but may be from about 400 nm to 800 nm. Also, a semi-circular curve of FIG. 4 represents the refractive index $n_s$ and the extinction factor $k_s$ of the absorber layer of total non-reflection for the refractive index $n_1$ of the optical thin film 13 ($n_1 = 2$ to 3.5). Herein, the refractive index 1.52 of glass is employed as the refractive index no of the transparent substrate 12, and the optical thin film 13 is the single film having the value of $n_1$. It is preferable that the optical thin film 13 is transparent, and $k_1 \cong 0$.

First of all, a semi-circular curve of FIG. 4 is noted. The value of $n_s$ where the semicircle rises is equal to the value of the refractive index $n_0$ of the transparent substrate 12. Accordingly, if the refractive index $n_s$ of the absorber layer 14 does not satisfy the condition $n_s > n_0$, the reflection prevention is not made effectively. Also, as the refractive index $n_1$ of the optical thin film 13 is greater, the diameter of circle is larger. Therefore, as the refractive index $n_1$ of the optical thin film 13 is greater, the condition where the reflection reducing effect is obtained is more likely to be satisfied. That is, there is a wider range of selecting the material of the absorber layer 14, and/or there is less influence due to the wavelength dispersion. If the refractive index $n_1$ of the optical thin film 13 does not satisfy the condition $n_1 > n_0$, the effective reflection prevention is not performed. It is preferable that $n_1$ is greater than 2.0, and more preferable that $n_1$ is greater than 2.5. The transparent substrate 12 is glass ($n_0 = 1.52$) in FIG. 4, in which as the refractive index no of the transparent substrate 12 is smaller, the diameter of semicircle is greater, widening the range to provide the above advantage. Accordingly, it is more preferable to employ the plastic substrate having a lower refractive index than glass as the transparent substrate 12.

As will be seen from the plots for various kinds of material in FIG. 4, Al or Ag having the refractive index $n_s$ below 1 does not satisfy the condition $n_s > n_0$, and can not be employed as the material of the absorber layer 14. This is in contrast to the case where Al or Ag is suitably employed as the reflector of the interferometric modulator with the iMoD™ method. From this, it will be understood that the interference of the interferometric modulator according to the invention is different from the Fabry-Pérot interference.

The materials of the absorber layer 14 for the interferometric modulator according to the invention, which satisfy the condition $n_s > n_0$ and have the smaller wavelength dispersion, are preferable. More specifically, Ta, Cr and W are suitably employed. Particularly, W is more preferable in the viewpoint of display quality, because the wavelength dispersion is small, and the condition $n_s > n_0$ is satisfied over the visible radiation area. For Ta, the used light wavelength and/or transparent substrate material may be selected, although $n_s$ is below 1.52 in a part of the wavelength region (on the longer wavelength side). It is not realistic to use Rh or Ni as the absorber because of a combination with the optical thin film.

The materials of the optical thin film 13 and the absorber layer 14 are not limited to the existent materials, but the layer having any complex index of refraction may be formed by a mixing deposition method, an oxidation degree method, or a method for changing the density of film. Also, the reflection reducing effect is enhanced by optimizing not only $n_1$ of the optical thin film 13 but also the physical film thickness $d_1$, as will be described later.

A preferred configuration for acquiring the excellent black display (reflection reducing effect) over the wider band centered at the reflection reducing wavelength λ will be described below.

To acquire the excellent reflection reducing effect in the black display, it is preferable to satisfy the relation of the following expression (1).

$$n_1 \cong \left( n_0 n_s + \frac{n_0 k_s^2}{n_s - n_0} \right)^{1/2} \quad (1)$$

Moreover, it is preferable that for a central wavelength λ for reflection prevention, the physical film thickness $d_1$ of the optical thin film 13 satisfies the following expression (2), when $n_1^2 - n_s^2 - k_s^2 > 0$, $$d_1 \cong \frac{\lambda}{2n_1}\left\{j - \frac{1}{2\pi}\tan^{-1}\left(\frac{-2n_1 k_s}{n_1^2 - n_s^2 - k_s^2}\right)\right\} \quad j: \text{interger} \quad (2)$$

or satisfies the following expression (3), when $n_1^2 - n_s^2 - k_s^2 < 0$, $$d_1 \cong \frac{\lambda}{2n_1}\left\{\left(j + \frac{1}{2}\right) - \frac{1}{2\pi}\tan^{-1}\left(\frac{-2n_1 k_s}{n_1^2 - n_s^2 - k_s^2}\right)\right\} \quad j: \text{interger} \quad (3)$$

The above expressions (1) to (3) are obtained from the conditions where R1 represented by the expression (1-2) is minimum.

In the expressions (2) and (3), if j is increased, the interval of reflection reducing wavelength at each interference order is narrower, and the wavelength area having the reflection reducing effect centered at the reflection reducing wavelength is narrower (e.g., see FIG. 6). Accordingly, to obtain the reflection reducing effect in wider band centered at the reflection reducing wavelength λ, $d_1$ is the smallest value satisfying the expression (2) or (3). That is, it is preferable to satisfy the relationship $0 < d_1 < \lambda/2\ n_1$ in the visible wavelength region (from 380 nm to 780 nm).

To obtain the excellent reflection increasing effect in the white display, the refractive index $n_v$ of a medium filling a gap (n2 in the expression (1-3)) is smaller than the refractive index $n_1$ of the optical thin film 13, and assuming that the separation distance between the absorber layer 14 and the optical thin film 13 is $d_v$ in the white display, for the reflection reducing wavelength λ, the following expression (4) is satisfied, $$d_v \cong \frac{(2m + 1)\lambda}{4 \cdot n_v} \quad m: \text{integer} \quad (4)$$

That is, it is most preferable that the optical distance $n_v d_v$ is matched with $(2m+1)\lambda/4$. The expression (4) is obtained from the condition where R2 represented by the expression (1-3) is maximum.

As described above, to obtain the excellent reflection increasing effect, the refractive index $n_v$ of the medium filling the gap must be smaller than $n_1$. Furthermore, to obtain the high reflection increasing effect, the refractive index ratio $n_v/n_1$ ($n_2/n_1$ in FIG. 2B) is preferably as small as possible. Accordingly, to obtain the high reflection increasing effect in the white display, the medium filling the gap is preferably vacuum or gas such as air having the refractive index of 1. Alternatively, a liquid having low refractive index such as water (nv=1.33) maybe employed.

The white display in the display unit according to the invention is realized in an optical multilayer system composed of "optical thin film/gap/absorber layer" provided for the interferometric modulator of each pixel, whereby the movement distance (variation amount of the distance of gap) of the absorber layer occurring by switching the black display state to the white display state may be within a range where optical interference can occur. The reflectance is lowest when the distance of the gap is 0, and highest when the distance of the gap is equal to $(2m+1)\lambda/4$ in optical distance, or $(2m+1)\pi/2$ in phase film thickness (m is an integer).

Alternatively, the maximum value of the distance of the gap may be the distance at which the optical interference will not occur. If the distance of the gap is sufficiently large with respect to the light wavelength (e.g., about 100 times or more the wavelength), interferometric multiple reflection occurs at the boundary between both without causing optical interference. The white display is allowed in this state. Employing this configuration, there is the advantage that the gap distance for the white display is easily controlled. If the gap distance is longer than one side of typical pixel size, the observer feels a parallax, whereby it is preferable that the maximum value of the gap distance is set to 500 μm or less.

Since the reflectance of the interferometric modulator provided for the reflection type display unit according to the invention is changed depending on the distance of the gap, it is possible to make the half tone display from the black display (minimum reflectance) to the white display (maximum reflectance) at steps by changing the gap distance stepwise. Accordingly, it is unnecessary to employ the area gradation, unlike the iMoD™ method, whereby the half tone display at high quality can be made with a smaller number of pixels.

To enhance the display quality of the reflection type display unit of the invention, a light scattering layer and/or a color filter may be further provided. They are disposed on the observer side of the transparent substrate 12, for example.

The light scattering layer gives an adequate luminous intensity distribution to the display light, thereby implementing a paper-like display. The light scattering layer may be an internal light scattering film (e.g., resin film with particles having different refractive index from that of the resin dispersed), a surface scattering film (e.g., embossing finish with irregularities in a unit of several μm on the surface), or a combination thereof. Particularly in the black display state, the light scattering layer has preferably a forward scattering characteristic to reduce the scattered light on the observer side. Accordingly, the internal light scattering film is more preferable than the surface light scattering film.

In the reflection type display unit of the invention, for example, the reflection reducing wavelength λ is set corresponding to each pixel of R, G and B, and the interferometric modulator (optical thin film or absorber layer) optimized for each λ is formed to realize the color display. However, the quality of color display is enhanced (e.g., the color reproduction range is enlarged) by further providing the color filter, as needed. When the interferometric modulator having small wavelength dispersion is employed (e.g., the absorber layer is formed using tungsten W), the configuration of the interferometric modulator is common to each pixel, and the color filter is employed for coloring. Employing this configuration, the inexpensive reflection type display unit is produced.

The reflection type display unit 10 as shown in FIG. 3 is specifically constructed in the following manner.

A glass plate having a thickness of 1.1 mm (wavelength λ=550 nm, refractive index $n_0$=1.52) is employed as the transparent substrate 12 and the substrate 20. The substrate 20 is not required to be transparent. The optical thin film 13 may be a $TiO_2$ thin film having a thickness of 33 nm (wavelength λ=550 nm, refractive index $n_1$=2.50, $k_1$=0). The $TiO_2$ thin film is formed on the glass substrate 12 by sputtering method.

The interval between the optical thin film 13 on the substrate 12 and the substrate 20 is defined by the spacer walls 17. This interval is about 15 μm, for example. The spacer walls 17 are formed of photosensitive resin, for example.

The absorber layer 14 may be a tantalum Ta thin film having a thickness of about 200 nm (wavelength λ=550 nm, refractive index $n_s$=2.47, $k_s$=1.84). The size of the absorber layer 14 is preferably from about 50 μm to 300 μm in accordance with the longitudinal and transversal sizes of pixel.

The piezoelectric element 15 may be an electric field responsive gel in which dimethylsulfoxide (DMSO) is contained in polyvinyl alcohol (PVA). This gel has a property that when an electric field is applied, it contracts in the direction parallel to electric field and swells in the direction perpendicular to electric field, and has a larger displacement amount than the piezoelectric material such as ceramic, an excellent elasticity, and an excellent adherence to the optical thin film 13.

In the interferometric modulator of the reflection type display unit 10, the gap distance between the absorber layer 14 and the optical thin film 13 is changed by adjusting a voltage between two electrodes 18 arranged in parallel on the substrate 20. That is, it is switched between the contact state and the separation state. One pair of electrodes 18 are arranged with a spacing of 20 μm, for example, each electrode 18 having a height of 0.5 μm and a width of 5 μm. The thickness of the piezoelectric element 15 is about 10 μm here.

Each pixel (i.e., interferometric modulator) of the reflection type display unit 10 is the black display when the gap distance is zero (i.e., contact state), and the while display when the gap distance is about 135 nm (highest brightness), although the gap distance between the optical thin film 13 and the absorber layer 14 is changed by applying a voltage from 0V to about 10V between the electrodes 18.

In the above configuration, the film thickness (d1) 33 nm of the $TiO_2$ thin film satisfies $d_1$ when the wavelength λ=550 nm and j=0 in the expression (3) (right side of the expression (3)=33.42), and $d_1$ is the minimum value at which the reflectance takes the minimal value, and satisfies the first minimum condition.

The optical characteristics of the reflection type display unit 10 having the above configuration were obtained by simulation, and its results will be described below. For simulation, Film Wizard™ made by SCI company was employed.

Figure 5:
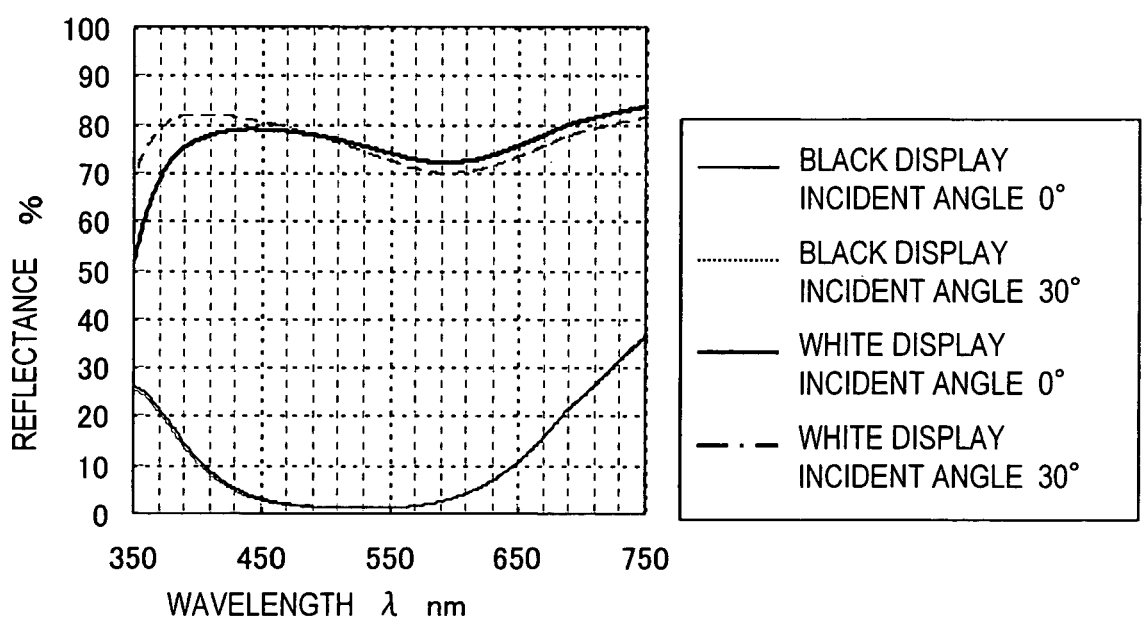
FIG. 5 is a graph representing a black display characteristic and a white display characteristic of the reflection type display unit 10.

First of all, the spectral reflectance characteristics of the black display state and the white display characteristic are shown in FIG. 5. The black display state and the white display state at the incident angles of 0° and 30° are represented. The incident angle of 0° means the incidence from the screen normal direction.

As will be seen from FIG. 5, the black display is reddish, but the excellent contrast ratio is obtained over the wide wavelength region centered at the reflection reducing wavelength of 550 nm. Also, the characteristics at the incident angle of 30° are almost equivalent to those of the incident angle of 0°, whereby the visual angle characteristic is more excellent than that of the conventional interferometric modulator with the iMoD™ method. That is, though the modulator with the iMoD™ method using the interference color is changed in color if the visual angle is changed, the interferometric modulator of this embodiment has a smaller change in the spectral reflectance.

Figure 6A:
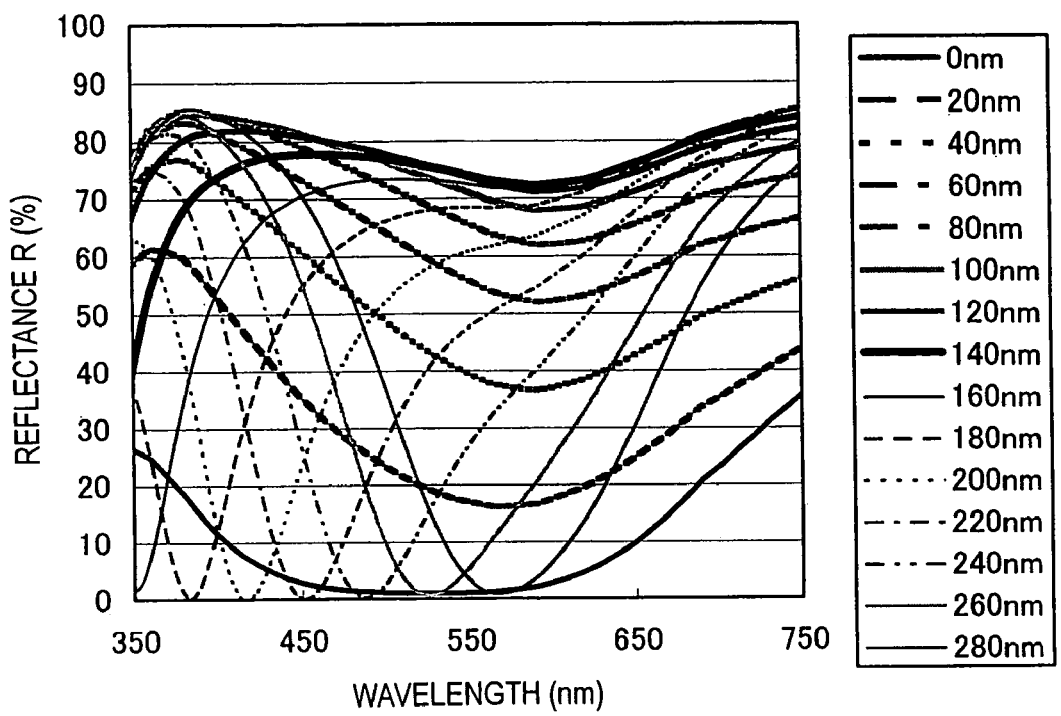

Also, the interferometric modulator of this embodiment can display the half tone by changing the gap distance between the optical thin film 13 and the absorber layer 14, as shown in FIG. 6. FIG. 6A shows the spectral reflectance characteristic when the gap distance is changed from 0 nm to 280 nm with the same configuration as shown in FIG. 5.

As seen from FIG. 6A, as the gap distance is increased from 0 nm, the reflectance increases monotonically over the wide wavelength region. When the gap distance is from 120 nm to 140 nm, there is an area where the reflectance is reversed with the wavelength. When the gap distance is near 135 nm, the most excellent white display is obtained as shown in FIG. 5. If the gap distance is further increased from 140 nm, the reflectance gradually decreases, but the wavelength region where the reflectance is minimum is narrower and the central wavelength is shifted more remarkably. Accordingly, when the gap distance is changed stepwise to represent the half tone, it is preferable that the gap distance is controlled in a range from 0 nm (contact state) to the value (here about 135 nm) at which the reflectance is firstly maximized.

Figure 6B:
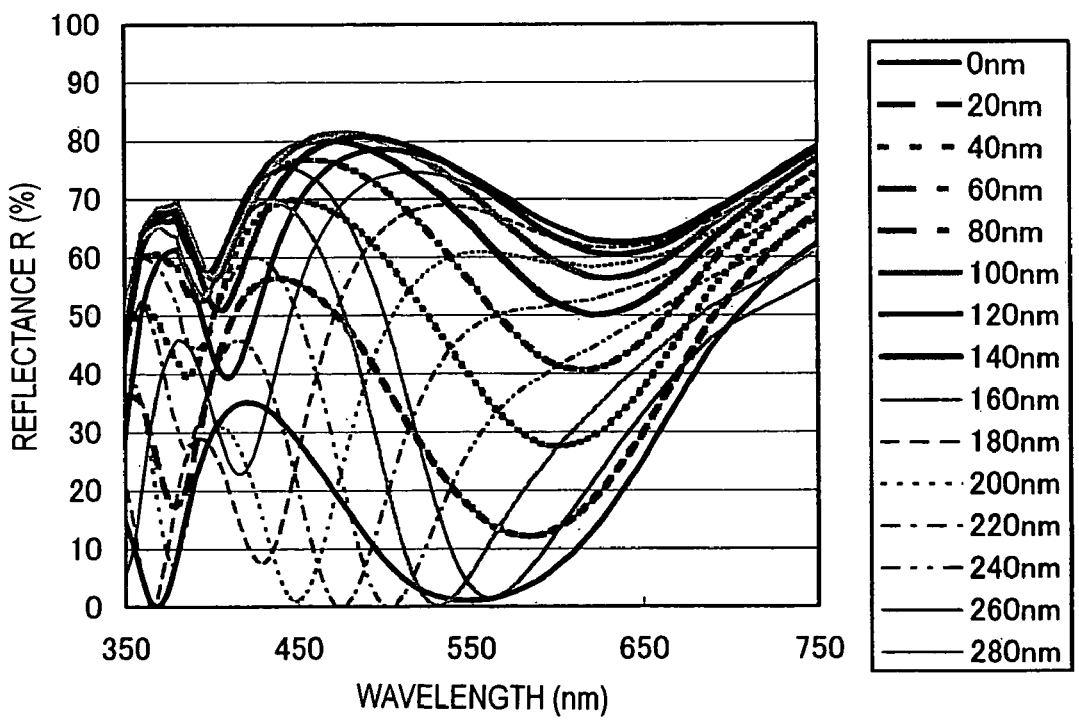

FIG. 6B shows the spectral reflectance characteristic when the thickness of the optical thin film 13 is about 143 nm (second minimum condition) in the above configuration. As will be apparent from the comparison between FIG. 6A and FIG. 6B, the reflectance has a greater wavelength dispersion in FIG. 6B than where the thickness of the optical thin film 13 is set to the minimum value satisfying the above expression (2) (or expression (3)) (FIG. 6A). Accordingly, to suppress the wavelength dispersion of the reflectance, it is preferable that the thickness of the optical thin film 13 is set to the minimum value satisfying the above expression (2) (or expression (3)) (first minimum condition).

Though the reflection reducing wavelength is set to 550 nm (green) in this embodiment, the above tendency can be seen at other wavelengths. Also, though no color filter is employed for display in the above explanation, the requirements for the wavelength dispersion of the reflectance are lightened, when the color filter is employed. Therefore, the interferometric modulator may be constructed in consideration of the absolute value of the reflectance and the contrast ratio to sufficiently suppress the wavelength dispersion in the required wavelength region.

The configuration of the piezoelectric element 15 is not limited to the above embodiment, but various kinds of well known piezoelectric elements may be employed. For example, the piezoelectric material may be quartz, Rochelle salt, or single crystal ceramics such as KPD, $BaTiO_3$, ZnO, PT, PZT, PLZT, $LiNbO_3$, and $LiTzO_3$. Also, it may be polyvinylidene fluoride as organic piezoelectric material, copolymer of PVDF and ethylene trifluoride (TFE) or vinyl fluoride (FV), or a composite material composed of PVDF, fluoro rubber or epoxy resin mixed with inorganic ferroelectric material such as $BaTiO_3$ or PZT.

Also, examples of the high molecular gel having electric response property may include naphyon as the ionic high molecular gel, polyaniline and polypyrrole as the conductive high molecules, polyurethane elastomer as the nonionic high molecular gel. Some liquid crystal elastomers having electric response property contain high molecules having a liquid crystal similarity structure at the side chain in which low molecular liquid crystal is swollen, whereby a change in the orientation of low molecular liquid crystal under electric field is passed as a movement to high molecular side chain to cause a macro deformation. For example, acrylic monomer having cyano biphenyl group radically copolymerized with n cross linking agent, and swollen in the low molecular liquid crystal is well known. Besides, typical waxes, fatty acids, fatty acid derivatives, and aromatic amide can be employed.

Moreover, the piezoelectric effects include a longitudinal effect in which substance expands or shrinks in a direction parallel to an electrical axis and a transversal effect in which substance expands or shrinks in a direction perpendicular to the electrical axis. Various structures are selectable, such as a single plate type, a stacked type a bimorph type, a Mooney type, and a cymbal type. Also, when ceramic materials are employed, the clearance may be placed in vacuum. The shape of electrode and the arrangement method may be selected depending on the kind of piezoelectric element. Also, when the absorber layer itself is composed of the absorber responsive to the external field, the driving element may be omitted.

(Embodiment 2)

Figure 7:
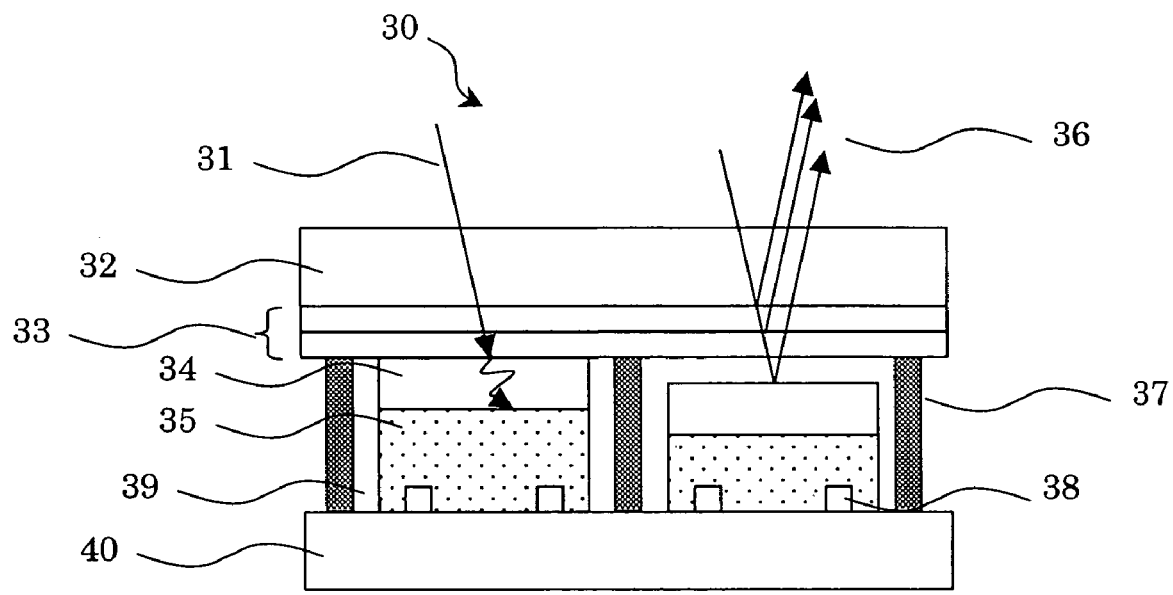
FIG. 7 is a schematic view showing the configuration of a reflection type display unit 30 according to an embodiment 2 of the invention.

FIG. 7 is a schematic view showing the configuration of a reflection type display unit 30 according to an embodiment 2 of the first aspect of the invention.

Each of the interferometric modulators making up the reflection type display unit 30 includes a transparent substrate 32, an optical thin film 33 provided on the transparent substrate 32, and an absorber layer 34 having the variable distance of a gap to the optical thin film 33.

The absorber layer 34 is formed on a driving element 35 provided on a substrate 40. The substrate 40 and the transparent substrate 32 (herein the optical thin film 33 formed on the transparent substrate 32) are spaced at a predetermined interval and fixed by the spacer walls 37. The spacer walls 37 enclose a medium 39 filling a gap formed between the absorber layer 34 and the optical thin film 33. The piezoelectric element 35 is controlled by one pair of electrodes 38.

When the absorber layer 34 and the optical thin film 33 are contacted, the optical thin film 33 functions as a anti-reflection film for the absorber layer 34, so that incindet light 31 is absorbed into the absorber layer 34, as indicated as a left pixel in FIG. 7. On the other hand, when the absorber layer 34 and the optical thin film 33 form a gap with a predetermined distance, most of incindet light is reflected due to reflection increasing effect, as indicated as aright pixel in FIG. 7 (reflected light 36).

The reflection type display unit 30 has the optical thin film 33 composed of an equivalent multilayer film, although the optical thin film 13 in the reflection type display unit 10 of the embodiment 1 is a single film. The other configuration is the same as the reflection type display unit 10, and the detailed explanation is omitted here.

Generally, the optical thin film having some refractive index can be equivalently replaced with a multilayer film composed of a layer (high refractive index layer) having a larger refractive index than the refractive index of the optical thin film and a layer (low refractive index layer) having a smaller refractive index than the refractive index of the optical thin film. Such multilayer film is called an equivalent multilayer film, and characterized by a single complex index of refraction. The equivalent multilayer film may be the multilayer film having layers disposed symmetrically with a central plane of the film, or the two-layer film in which the thickness of layer is sufficiently small, for example. Each of the high refractive index layer and the low refractive index layer making up the multilayer film are not limited to one kind, but three or more kinds of layers having different refractive indexes may be stacked symmetrically with the central plane.

By employing the equivalent multilayer film 33, the reflection reducing effect is improved over the use of the optical thin film 13 of single layer.

As described above, in order that the optical thin film 13 functions as the anti-reflection film, it is required that predetermined conditions (complex index of refraction and film thickness) are satisfied. However, the choices of materials that can be actually used for the optical thin film 13 are limited. Generally, the optical thin film 13 having a desired complex index of refraction which make the reflectance zero corresponding to the complex index of refraction of the absorber layer 14 can not be formed of a single material. On the contrary, employing the equivalent multilayer film, the optical thin film 33 having an intermediate complex index of refraction is formed by a combination of the high refractive index layer and the low refractive index layer, thereby satisfying (or almost satisfying) the reflection preventing condition.

Moreover, among a plurality of layers making up the optical thin film 33, the layer located closest to the absorber layer 34 is provided with the lowest refractive index, whereby the reflectance in the black display state is further reduced. It is more preferable that the layer located closest to the absorber layer 34 is made of the material having the same refractive index as that of the medium filling the gap. Since the black display occurs in a state where the absorber layer 34 is contact with the optical thin film 33, the reflection reducing effect is decreased, if the contact between the absorber layer 34 and the optical thin film 33 is less sufficient. In such a case, if the refractive index of the layer located closest to the absorber layer 34 is lowest in the optical thin film 33, a difference in the refractive index from the medium filling the gap is smaller than where the optical thin film 13 has a single layer structure, whereby the lower reflection reducing effect is suppressed. Furthermore, if the layer located closest to the absorber layer 34 is made of the same material as the medium filling the gap, there is the advantage that the reflection reducing effect is unlikely to be reduced even when the surface of the optical thin film 33 is damaged by contact between the absorber layer 34 and the optical thin film 33.

The reflection type display unit 30 as shown in FIG. 7 is specifically constructed in the following manner.

A glass plate having a thickness of 1.1 mm (wavelength $\lambda=550$ nm, refractive index $n_0=1.52$) is employed as the transparent substrate 32 and the substrate 40. The interval between the optical thin film 33 on the substrate 32 and the substrate 40 is set at about 15 μm by the spacer walls 37.

As the absorber layer 34, a chromium Cr thin film having a thickness of about 200 nm (wavelength $\lambda=550$ nm, refractive index $n_s=3.17$, $k_s=3.33$) is employed.

The optical thin film 33, as the equivalent multilayer film 33 for the ideal optical thin film (refractive index $n_1=3.88$, physical film thickness $d_1=20.35$ nm) making the full reflection prevention at a wavelength $\lambda=550$ nm for the absorber layer 34 of Cr, is formed of a single crystal Si thin film having a film thickness of 17.17 nm and an $SiO_2$ thin film having a film thickness of 2.37 nm in sequence from the side where it is contact with the glass substrate 32. The single crystal Si is generally employed as the transparent material for infrared rays, but is suitably employed for the optical thin film of the interferometric modulator according to the embodiment of the invention, because the refractive index n is as high as 3.6 to 5.5 in the visible radiation area, and the extinction coefficient k is as low as 0.2 to 0.6. Also, the $SiO_2$ thin film can utilize a natural oxide film of the Si thin film.

As the piezoelectric element 35, an electric field responsive gel having a thickness of about 10 μm that is the same as in the embodiment 1 is employed. The other configuration is the same as the reflection type display unit 10 of the embodiment 1.

Each pixel (i.e., interferometric modulator) of the reflection type display unit 30 can make the gradation display by applying a voltage of 0V to about 10V across the electrode 38 in the same manner as the reflection type display unit 10.

Figure 8A:
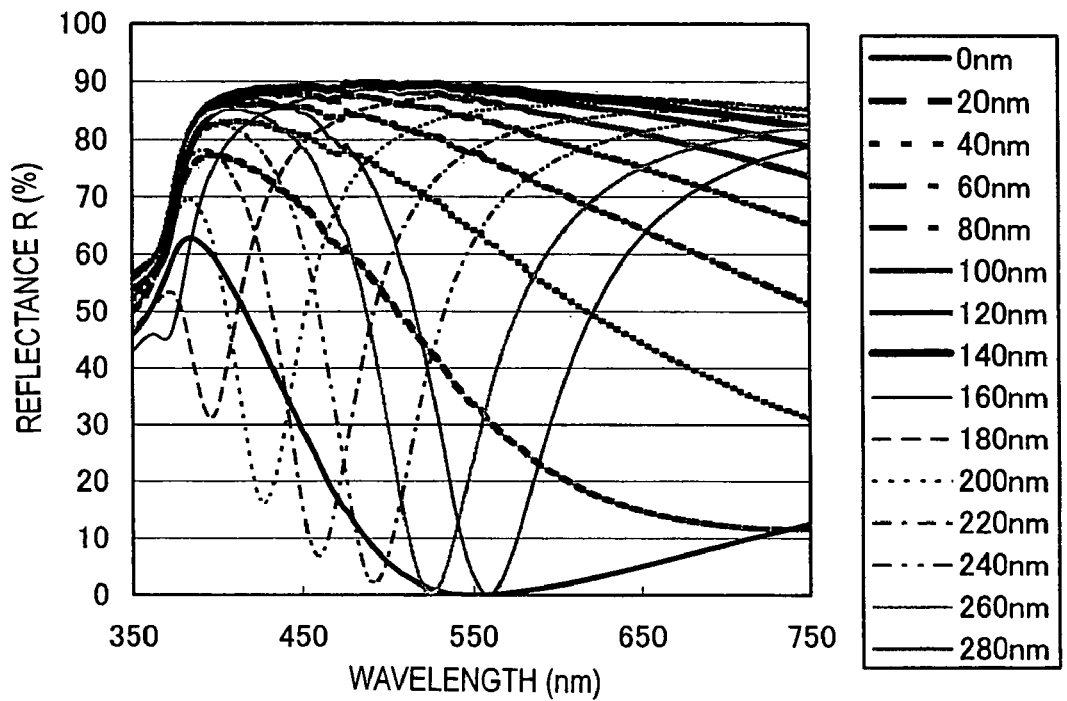

From the spectral reflectance characteristic as shown in FIG. 8A, when the gap distance between the optical thin film 33 and the absorber layer 34 is zero (i.e., contact state), the black display is made, while when the gap distance is about 140 nm, the white display (highest brightness) is made. As will be apparent from the comparison between FIG. 8A and FIG. 6A, the reflection type display unit 30 of this embodiment is a lower reflectance in the black display at the reflection reducing wavelength of 550 nm, and a higher reflectance in the white display. By employing the equivalent multilayer film in this manner, the more excellent reflection reducing effect can be obtained.

Though there is a greater wavelength dependence in FIG. 8A than FIG. 6A, for example, when the color display is made, the reflection reducing wavelength is set for each color, and the color filter is further employed, as needed, whereby there is more advantage of the equivalent multilayer film.

Figure 8B:
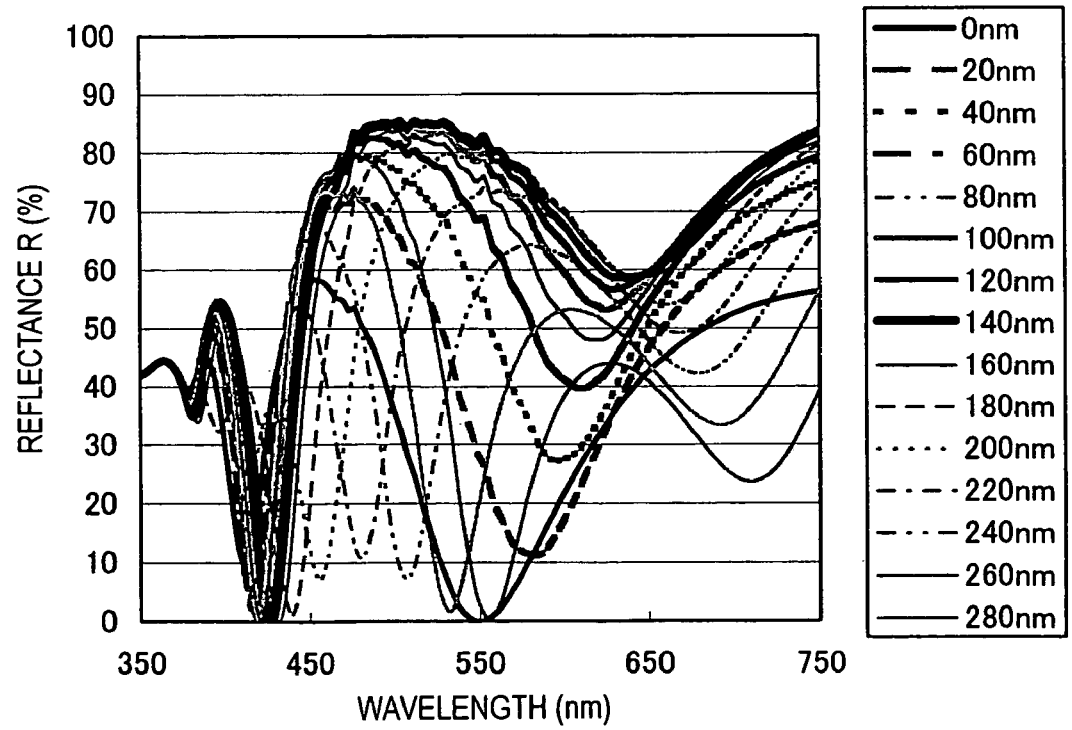

FIG. 8B shows the spectral reflectance characteristic in which the optical thin film 33 is formed of a single crystal Si thin film having a film thickness of 83.45 nm and an $SiO_2$ thin film having a film thickness of 4.37 nm in sequence from the side where it is contact with the glass substrate 32 (second minimum condition). As will be apparent from the comparison between FIG. 8A and FIG. 8B, the wavelength dispersion of the reflectance is greater in FIG. 8B than where the equivalent film thickness of the optical thin film (equivalent multilayer film) 33 is set to the minimum value satisfying the expression (2) (or expression (3)) (FIG. 8A). Accordingly, to suppress the wavelength dispersion of the reflectance, it is preferable that the thickness of the optical thin film 33 is set to the minimum value satisfying the expression (2) (or expression (3)) (first minimum condition).

(Embodiment 3)

Figure 9:
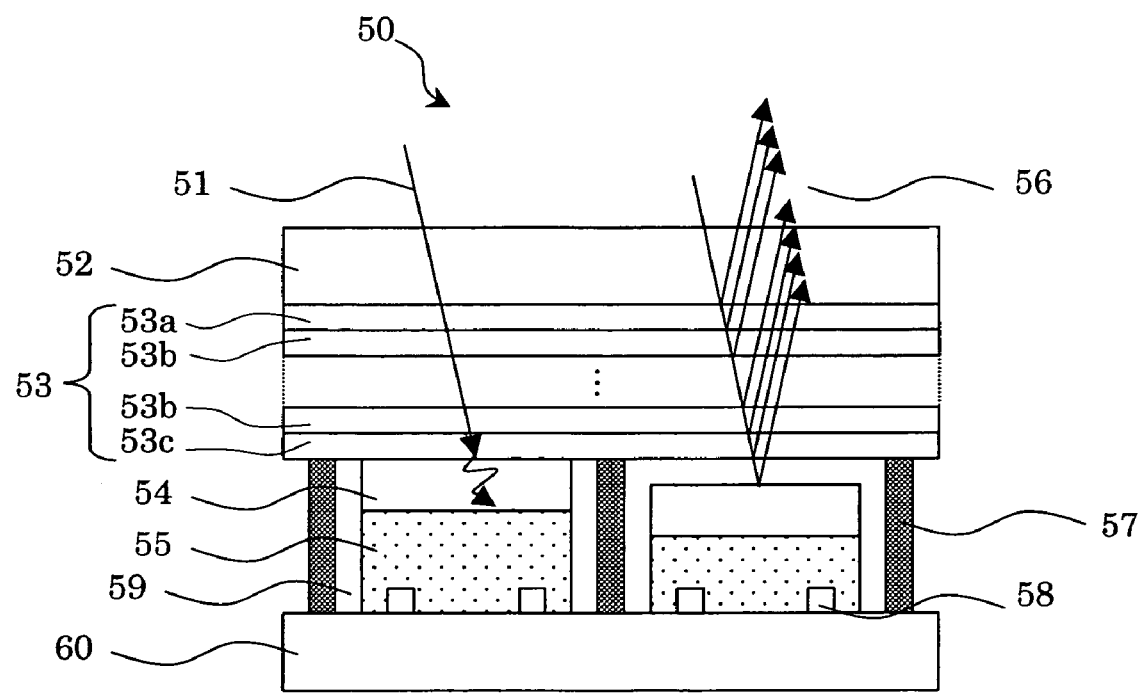
FIG. 9 is a schematic view showing the configuration of a reflection type display unit 50 according to an embodiment 3 of the invention.

FIG. 9 is a schematic view showing the configuration of a reflection type display unit 50 according to an embodiment 3 of the second aspect of the invention.

Each of the interferometric modulators making up the reflection type display unit 50 includes a transparent substrate 52, a stacked film 53 provided on the transparent substrate 52, and an absorber layer 54 having the variable distance of a gap to the stacked film 53. The stacked film 53 has three or more transparent thin film layers, the complex indexes of refraction of two adjacent transparent thin film layers being mutually different. The stacked film 53 as shown here has an alternate stacked film in which a first transparent thin film layer 53a having a larger refractive index and a second transparent thin film layer 53b having a smaller refractive index are alternately stacked, and a third transparent thin film layer 53c opposed to the absorber layer 54 provided on the alternate stacked film. Employing the alternate stacked film, the stacked film 53 can be fabricated relatively cheaply.

The absorber layer 54 is formed on a driving element 55 provided on a substrate 60. The substrate 60 and the transparent substrate 52 (herein the stacked film 53 formed on the transparent substrate 52) are spaced at a predetermined interval and fixed by the spacer walls 57. The spacer walls 57 enclose a medium 59 filling a gap formed between the absorber layer 54 and the stacked film 53. The piezoelectric element 55 is controlled by one pair of electrodes 58.

When the absorber layer 54 and the stacked film 53 are contacted, the stacked film 53 functions as a anti-reflection film for the absorber layer 54, so that incindet light 51 is absorbed into the absorber layer 54, as indicated as a left pixel in FIG. 9. On the other hand, when the absorber layer 54 and the stacked film 53 form a gap with a predetermined distance, most of incindet light is reflected due to reflection increasing effect, as indicated as a right pixel in FIG. 9 (reflected light 56).

The reflection type display unit 50 has the stacked film 53, instead of the optical thin film 13 in the reflection type display unit 10 of the embodiment 1, whereby there is the excellent reflection reducing effect over a wider band. The full reflection prevention in which the reflectance is zero only takes place at a single wavelength (central wavelength) in the case of the single layer film. Generally, the optical constant of substance varies with the wavelength and has a wavelength dispersion, so that the reflectance is not exactly zero at wavelengths other than the central wavelength, requiring the multilayer film for reflection prevention over the wider wavelength region. The reflection type display unit 50 as shown in FIG. 9 has the stacked film 53 with the thickness of each layer changed, whereby the reflection reducing area is widened and the visual angle dependence is improved.

The condition for which the combination of the stacked film 53 and the absorber layer 54 exhibits the reflection reducing effect (black display) and the reflection increasing effect (white display) over the wide band in the visible radiation area will be described below.

Generally, the optical characteristics of the multilayer film are represented using a characteristic matrix of a multilayer film system (here system including the stacked film 53 and the absorber 54), in which the characteristic matrix of the multilayer film is defined as the product of characteristic matrix of each layer. The reflectance is acquired on a boundary plane between an incidence medium having an optical admittance (refractive index) $\eta_0$ and the multilayer film system having a specific optical admittance. Accordingly, when both the optical admittances are matched, the reflection reducing effect is obtained, while when they are greatly different, the reflection increasing effect is obtained.

Herein, in the stacked film 53 in which M (M is a positive integer equal to or greater than 3) layers are stacked, assuming that the refractive index of the transparent substrate 52 is $\eta_0$, the complex index of refraction of the absorber layer 54 is $\eta_s = n_s - i \cdot k_s$, the complex index of refraction of the j-th layer (53a, 53b or 53c) from the side nearer to the transparent substrate 52 is $\eta_j = n_j - i \cdot k_j$, and the phase film thickness is δj, the condition for attaining the high reflectance in the white display is required to be $k_j \cong 0$ in which each layer is transparent.

Moreover, to acquire the excellent reflection reducing effect in the black display, if B and C are given by the following expression (5), $$\begin{pmatrix} B \\ C \end{pmatrix} = \left\{ \prod_{j=1}^{M} \begin{pmatrix} \cos\delta_j & i\cdot\sin(\delta_j)/\eta_j \\ i\cdot\eta_j\cdot\sin(\delta_j) & \cos(\delta_j) \end{pmatrix} \right\} \begin{pmatrix} 1 \\ \eta_s \end{pmatrix} \quad (5)$$

in a visible wavelength region (380 nm<λ<780 nm), the following relation (6) is preferably satisfied, $$\left(\frac{\eta_0\cdot B - C}{\eta_0\cdot B + C}\right)\left(\frac{\eta_0\cdot B - C}{\eta_0\cdot B + C}\right)^* < \left(\frac{\eta_0 - \eta_s}{\eta_0 + \eta_s}\right)\left(\frac{\eta_0 - \eta_s}{\eta_0 + \eta_s}\right)^* \quad (6)$$

(∗ complex conjugate)

Also, in order for the substance filling the gap 59 and the combination of the absorber layer 54, the stacked film 53 and the gap to achieve the reflection increasing effect (white display) over the wide band in the visible radiation area, the following expression is preferably satisfied.

Assuming that the refractive index of the medium filling the gap formed between the stacked-layer film 53 and the absorber layer 54 is $\eta_v$, the physical distance of the gap is $\delta_v$, and D and E are given by the following expression (7), $$\begin{pmatrix} D \\ E \end{pmatrix} = \left\{ \prod_{j=1}^{M} \begin{pmatrix} \cos\delta_j & i\cdot\sin(\delta_j)/\eta_j \\ i\cdot\eta_j\cdot\sin(\delta_j) & \cos(\delta_j) \end{pmatrix} \right\}$$

$$\begin{pmatrix} \cos\delta_v & i\cdot\sin(\delta_v)/\eta_v \\ i\cdot\eta_v\cdot\sin(\delta_v) & \cos(\delta_v) \end{pmatrix} \begin{pmatrix} 1 \\ \eta_s \end{pmatrix} \quad (7)$$

in a visible wavelength region (380 nm<λ<780 nm) of wide band, the following expression (8) is preferably satisfied, $$\left(\frac{\eta_0\cdot D - E}{\eta_0\cdot D + E}\right)\left(\frac{\eta_0\cdot D - E}{\eta_0\cdot D + E}\right)^* > \left(\frac{\eta_0 - \eta_s}{\eta_0 + \eta_s}\right)\left(\frac{\eta_0 - \eta_s}{\eta_0 + \eta_s}\right)^* \quad (8)$$

(∗ complex conjugate)

Particularly, to achieve the excellent white display, it is preferable that the refractive index $\eta_v$ is as low as possible, and the physical film thickness $\delta_v$ is $(2m+1)\pi/2$ (m is an integer) at a specific wavelength in the wavelength region where there is the reflection reducing effect.

The reflection type display unit 50 as shown in FIG. 9 is specifically constructed in the following manner.

A glass plate having a thickness of 1.1 mm (wavelength λ=550 nm, refractive index $n_0$=1.52) is employed as the transparent substrate 52 and the substrate 60. The interval between the stacked film 53 and the optical thin film 13 on the substrate 52 and the substrate 60 is set at about 15 μm by the spacer walls 57.

As the absorber layer 54, a tungsten W thin film having a thickness of about 200 nm is employed.

The stacked film 53 may be the alternate stacked film composed of $Ta_2O_5$ (first transparent thin film layer 53a) having a thickness of 14.56 nm, $SiO_2$ (second transparent thin film layer 53b) having a thickness of 33.58 nm, $Ta_2O_5$ having a thickness of 138.88 nm, $SiO_2$ having a thickness of 35.53 nm, $Ta_2O_5$ having a thickness of 33.44 nm, $SiO_2$ having a thickness of 27.09 nm, $Ta_2O_5$ having a thickness of 89.09 nm, $SiO_2$ having a thickness of 25.7 mm, $Ta_2O_5$ having a thickness of 13.52 nm, $SiO_2$ having a thickness of 106.2 nm, and $Ta_2O_5$ having a thickness of 6.93 nm in sequence from the side where it is contact with the glass substrate 52 on the observer side. The third transparent thin film layer 53c provided on the side of the absorber layer 54 in the alternate stacked film may be the $TiO_2$ film having a thickness of 31.24 nm. The $Ta_2O_5$ thin film and the $SiO_2$ thin film are formed by vacuum deposition, and the $TiO_2$ thin film is formed by sputtering.

Each pixel (i.e., interferometric modulator) of the reflection type display unit 50 can make the gradation display by applying a voltage of 0V to about 10V across the electrode 58 in the same manner as the reflection type display unit 10.

Figure 10A:
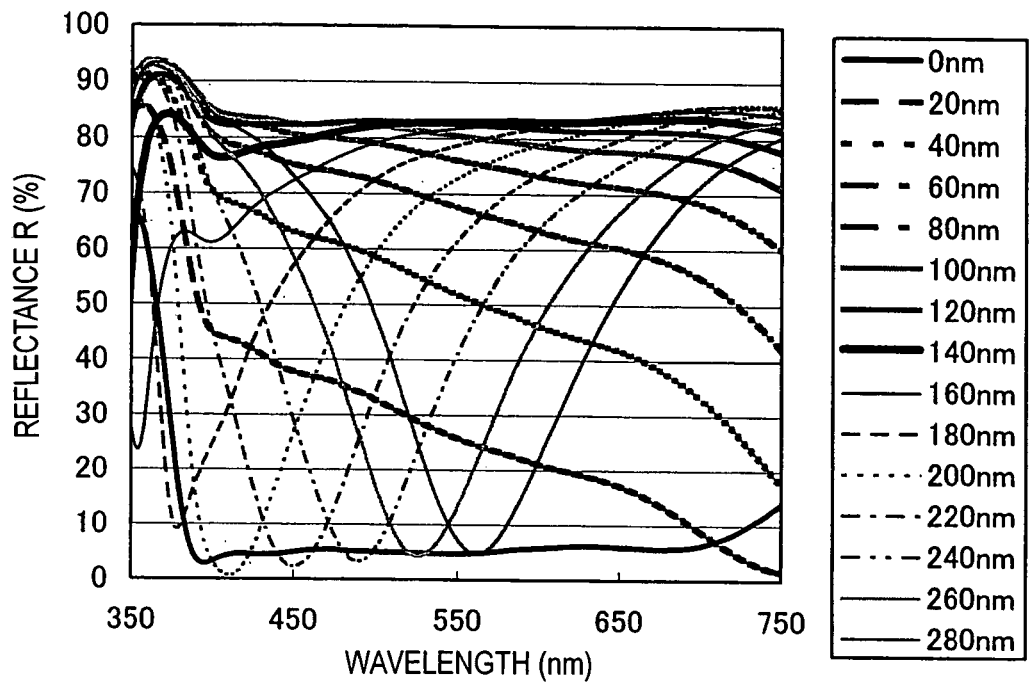

From the spectral reflectance characteristic as shown in FIG. 10A, when the gap distance between the stacked film 53 and the absorber layer 54 is zero (i.e., contact state), the black display is made, while when the gap distance is about 140 nm, the white display (highest brightness) is made. As will be apparent from the comparison between FIG. 10A and FIG. 6A, the reflection type display unit 50 of this embodiment has a higher reflectance in the black display at the reflection reducing wavelength of 550 nm, but a lower reflectance over the wide area. Also, the reflection type display unit 50 has a higher reflectance in the white display over the wider area. The Y values in the black and white displays are 5.2 and 82.5, and the contrast ratio is about 16.

Figure 10B:
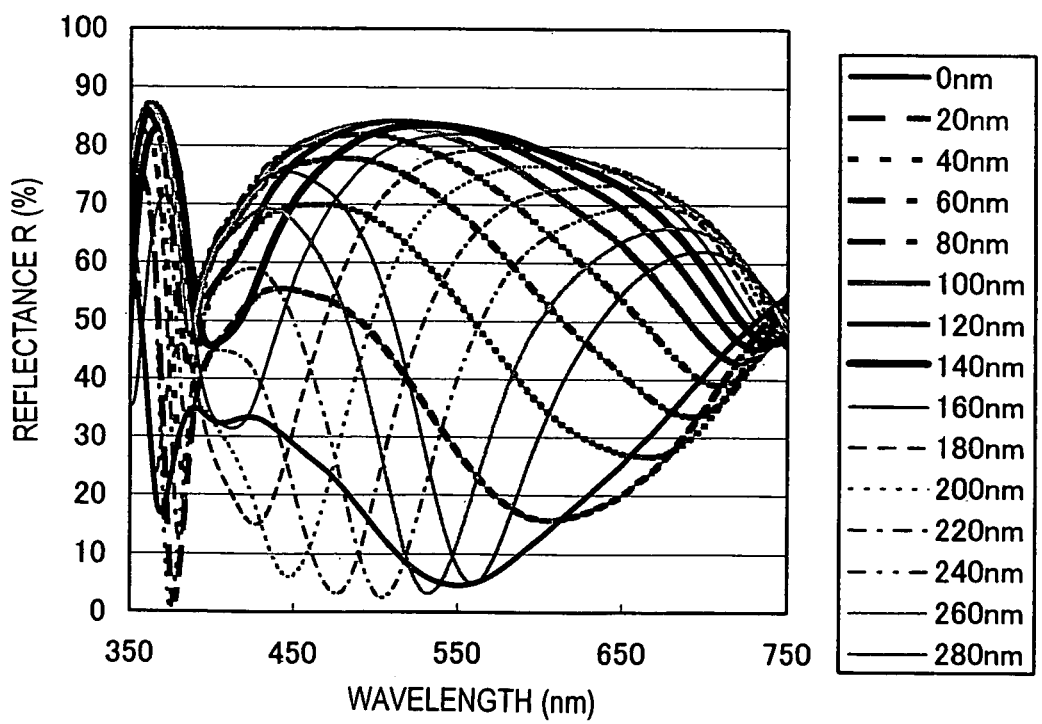

FIG. 10B shows the spectral reflectance characteristic in which the third transparent thin film 53c is formed of a $TiO_2$ film having a film thickness of 142.61 nm (second minimum condition) As will be apparent from the comparison between FIG. 10A and FIG. 10B, the wavelength dispersion of the reflectance is greater in FIG. 10B than where the thickness of the third transparent thin film 53c in the stacked film 53 is set to the minimum value (FIG. 10A). Accordingly, to suppress the wavelength dispersion of the reflectance, it is preferable that the thickness of the third transparent thin film 53c is set to the minimum value (first minimum condition).

Though in the above embodiments 1 to 3, the glass substrate is employed for the transparent substrate, the invention is not limited thereto. The kind of the transparent substrate may be plastic, as far as the visible radiation transmittance is high. Examples of polymer forming the transparent plastic substrate include cellulose ester, polyamide, polycarbonate, polyester, polystyrene, polyolefin, polysulfone, polyetersulfone, polyacrylate, polyeter imide, polymethyl methacrylate, and polyeter ketone. Since the refractive index $n_0$ of the transparent substrate that is the light incidence medium is a factor for deciding the configuration of the optical thin film and the absorber layer, the low refractive index is preferable. The thickness of the transparent substrate is not limited except that the film is so thick as to cause no optical interference, but may be appropriately selected in accordance with the use purposes.

Examples of the optical thin film material include $TiO_2$, $ZrO_2$, $ZnS$, $HfO_2$, $Ta_2O_5$, $Nb_2O_5$, $In_2O_3$, $Nd_2O_3$, $Sb_2O_3$, $CeO_2$, $ZnSe$, $CdS$, $Sb_2S_3$, $Si$, $Ge$, and $PbTe$, which have high refractive index, $Al_2O_3$, $CeF_3$, $MgO$, $LaF_3$, $CeF_3$, $ThO_2$, $La_2O_3$, $SiO$, which has the intermediate refractive index, and $MgF_2$, $SiO_2$, $CaF_2$, $NaF$, $Na_3AlF_6$, and $LiF$, which has the low refractive index. Examples of the transparent conductive film include ITO, ZnO(Al, In, Si), $CdO$—$SnO_2$ (CTO: $CdSnO_4$), $ZnO$—$SnO_2$ ($Zn_2SnO_4$), $CdIn_2O_4$, which are employed according to the optical characteristics of intent.

Also, these film formation methods include a physical vapor deposition (PVD) such as a vacuum deposition method with evaporation, and a sputtering method of inert gas ions, a chemical vapor deposition (CVD) using the chemical reaction, an electrochemical plating method using the growth from the liquid phase, and a spray method.

(Embodiment 4)

Though in the above embodiments 1 to 3, the gap between the optical thin film or stacked film and the absorber layer is controlled (using the interference) to make the white display, the white display is made without interference here. A modification of the embodiment 3 is exemplified, but the embodiments 1 and 2 may be likewise modified.

A reflection type display unit 70 of an embodiment 4 has one pair of upper and lower transparent substrates 72 and 80 made of glass having a thickness of 1.1 mm are fixed with an interval of about 50 µm by the spacer walls 78, as shown in FIG. 9. The air is filled in a gap 79.

Also, an ITO electrode 77 having a thickness of 200 nm is provided on an observer side glass substrate 72 on the observer side, and a stacked film 73 is provided on an absorber layer 74. The stacked film 73 is the same as the stacked film 53 of the reflection type display unit 50 of the embodiment 3.

An ITO electrode 76 is provided on a lower glass substrate 80, and a positive hole transport layer 75 having a thickness of 5 µm is formed thereon. The positive hole transport layer 75 is formed by coating a solution composed of 4-dietylamino-2-methylbenzaldehyde-1,1-diphenyl-hydrazone as a positive hole transport material and polycarbonate which are mixed at a weight ratio of 1:1 on the ITO electrode 76 by spin coating method.

The absorber layer 74 is composed of plate-like powder of tungsten (W) 3 µm in size and about 280 nm thick. This plate-like powder is formed by coating a positive resist (S1813, Shipley) as a sacrificial layer on the substrate, forming a W film having a thickness of 280 nm thereon by sputtering method, patterning it into 3 µm square by lithography, and dissolving the sacrificial layer with ethanol as the solvent.

Figure 11:
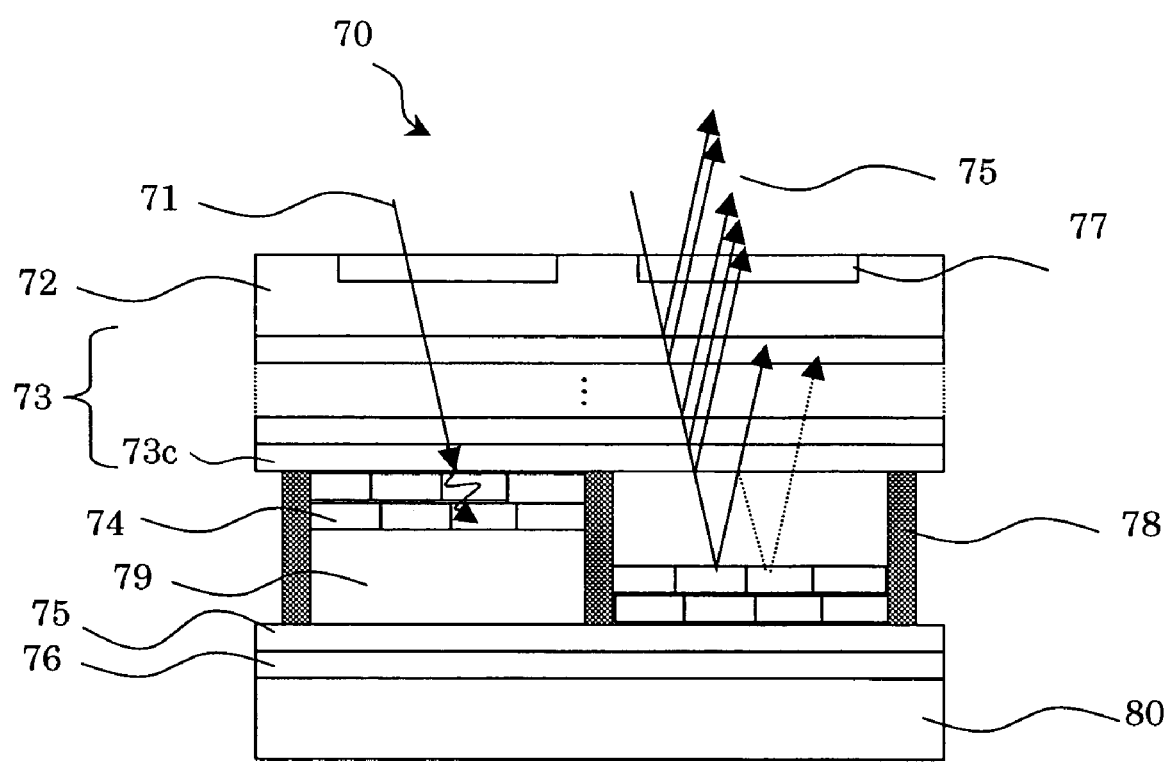
FIG. 11 is a schematic view showing the configuration of a reflection type display unit 70 according to an embodiment 4 of the invention.

The plate-like powder composing the absorber layer 74 is driven by electrostatic force by applying a voltage (0V to about 100V) between the electrodes 76 and 77, and switched between a state where it is contact with the stacked film 73 (left in FIG. 11) and a state where it is fully separated (right in FIG. 11).

The black display is made in the state where the absorber layer 74 is contact with the stacked film 73 and the white display is made in the state where it is fully separated from the stacked film 73 (deposited on the positive hole transport layer 75: the gap distance is about 500 µm). The distance in the separated state may be long enough to cause no optical interference, and it is unnecessary to control the voltage, whereby the configuration for driving is simpler.

Though the ITO electrode 77 is formed on the observer side glass substrate 72 on the observer side in the example as shown in FIG. 11, a transparent conduction film may be employed as an upper electrode, when the transparent conductive film such as ITO is provided on the side of the stacked film 73 closest to the absorber layer 74 (third transparent thin film layer 73c). Employing this configuration, there is the advantage that the structure is simplified. Particularly, the display unit of simple matrix type can be simplified in the structure. The simplified configuration employing this transparent conductive film is also applicable to the reflection type display unit according to the embodiments 1 to 3.

With this invention, the interferometric modulator having high reflectance and high contrast ratio can be produced. Employing this interferometric modulator, the reflection type display unit having high brightness and high contrast ratio can be produced. Though the reflection type display unit of the invention is suitably employed for various electronic apparatuses, it is suitable for displaying the character information and image information (including moving picture information) in the portable electronic apparatuses represented by an electronic book of mobile purpose that is used outdoors.

The interferometric modulator of the invention is not limited to the reflection type display unit of direct viewing type, but may be also applied to the projection type display unit, and the light modulation elements such as a spatial light modulation element, an optical communication switching element, and a light shutter.

This non-provisional application claims priority under 35 USC § 119(a) on Patent Application No. 2003-307734 filed in Japan on Aug. 29, 2003, the entire contents of which are hereby incorporated by reference.

What is claimed is:

1. An interferometric modulator comprising:
a transparent substrate having a refractive index of $n_0$;
an optical thin film having a complex index of refraction of $N_1 = n_1 - i \cdot k_1$, where $n_1$ is the refractive index of the optical thin film and $k_1$ is the extinction coefficient of the optical thin film, and provided on said transparent substrate; and
an absorber layer having a complex index of refraction of $N_s = n_s - i \cdot k_s$, where $n_s$ is the refractive index of the absorber layer and $k_s$ is the extinction coefficient of the absorber layer, and opposed to said optical thin film; wherein
a gap having a distance to said optical thin film is variable; and
the following relation is satisfied, $n_1 n_0$, $k_1 \cong 0$ and $n_s > n_0$.

2. The interferometric modulator according to claim 1, wherein the following relation of expression (1) is satisfied, $$n_1 \cong \left( n_0 n_s + \frac{n_0 k_s^2}{n_s - n_0} \right)^{1/2}. \tag{1}$$

3. The interferometric modulator according to claim 1, wherein for a wavelength λ in a visible radiation region, a physical film thickness $d_1$ of said optical thin film satisfies the following expression (2), when $n_1^2 - n_s^2 - k_s^2 > 0$, $$d_1 \cong \frac{\lambda}{2n_1} \left\{ j - \frac{1}{2\pi} \tan^{-1}\left( \frac{-2n_1 k_s}{n_1^2 - n_s^2 - k_s^2} \right) \right\} \quad j: \text{integer} \tag{2}$$

or satisfies the following expression (3), when $n_1^2 - n_s^2 - k_s^2 < 0$, $$d_1 \cong \frac{\lambda}{2n_1} \left\{ \left( j - \frac{1}{2} \right) - \frac{1}{2\pi} \tan^{-1}\left( \frac{-2n_1 k_s}{n_1^2 - n_s^2 - k_s^2} \right) \right\} \quad j: \text{integer.} \tag{3}$$

4. The interferometric modulator according to claim 3, wherein $d_1$ is the smallest value in which the expression (2) or (3) is satisfied.

5. The interferometric modulator according to claim 1, wherein the refractive index $n_v$ of a medium filling a gap formed between said optical thin film and said absorber layer is smaller than the refractive index $n_1$ of said optical thin film, and assuming that a physical distance of said gap is $d_v$, for wavelength $\lambda$ in the visible radiation region, the following expression (4) is satisfied, $$d_v \cong \frac{(2m+1)\lambda}{4 \cdot n_v} \quad m\text{: integer.} \tag{4}$$

6. The interferometric modulator according to claim 1, wherein said optical thin film is composed of an equivalent multilayer film.

7. The interferometric modulator according to claim 1, wherein the distance of said gap formed between said optical thin film and said absorber layer is changed within an interferometric range.

8. The interferometric modulator according to claim 1, wherein the distance of said gap formed between said optical thin film and said absorber layer is changed up to the optical distance at which no interference occurs.

9. The interferometric modulator according to claim 1, wherein said gap formed between said optical thin film and said absorber layer is changed stepwise.

10. The interferometric modulator according to claim 1, further comprising a driving element for changing the distance of said gap formed between said optical thin film and said absorber layer.

11. The interferometric modulator according to claim 10, wherein said driving element comprises a piezoelectric element.

12. The interferometric modulator according to claim 1, wherein said gap formed between said optical thin film and said absorber layer is vacuum or filled with gas.

13. The interferometric modulator according to claim 1, wherein said gap formed between said optical thin film and said absorber layer is filled with liquid.

14. The interferometric modulator according to claim 1, further comprising a color filter disposed on the transparent substrate for passing light having a specific wavelength.

15. The interferometric modulator according to claim 1, further comprising a light scattering layer disposed on the transparent substrate.

16. The interferometric modulator according to claim 1, wherein said optical thin film comprises at least one transparent conductive layer.

17. The interferometric modulator according to claim 16, wherein the distance of said gap formed between said optical thin film and said absorber layer is changed in accordance with a voltage applied to said at least one transparent conductive layer.

18. A display unit having a plurality of pixels, each of which comprises the interferometric modulator according to claim 1.

19. The display unit according to claim 18, wherein said plurality of pixels comprise a first pixel and a second pixel, in which said interferometric modulators provided for said first pixel and said second pixel are mutually different in the configuration of said optical thin film, or said absorber layer.

20. An electronic apparatus comprising the display unit according to claim 19.

21. An interferometric modulator comprising:
a transparent substrate having a refractive index of $\eta_0$;
a stacked-layer film provided on said transparent substrate; and
an absorber layer having a complex index of refraction $\eta_s = n_s - i \cdot k_s$, where $n_s$ is refractive index of the absorber layer and $k_s$ is the extinction coefficient of the absorber layer, and opposed to said stacked-layer film; wherein
a gap having a distance to said stacked-layer film is variable;
said stacked-layer film has M transparent thin film layers, where M is three or more, the complex indexes of refraction of two adjacent transparent thin film layers being mutually different, the complex index of refraction of a j-th thin film layer, where j is between one and M, from a side nearest to said transparent substrate is $\eta_j = n_j - i \cdot k_j$, where $n_j$ is the refractive index of the j-th thin film layer and $k_j$ is the extinction coefficient of the j-th thin film layer, a phase film thickness is $\delta_j$, and B and C are given by the following expression (5), $$\begin{pmatrix} B \\ C \end{pmatrix} = \left\{ \prod_{j=1}^{M} \begin{pmatrix} \cos\delta_j & i \cdot \sin(\delta_j)/\eta_j \\ i \cdot \eta_j \cdot \sin(\delta_j) & \cos(\delta_j) \end{pmatrix} \right\} \begin{pmatrix} 1 \\ \eta_s \end{pmatrix} \tag{5}$$

$k_j \cong 0$, and in a visible wavelength region, the following expression (6) is satisfied, $$\left(\frac{\eta_0 \cdot B - C}{\eta_0 \cdot B + C}\right)\left(\frac{\eta_0 \cdot B - C}{\eta_0 \cdot B + C}\right)^* < \left(\frac{\eta_0 - \eta_s}{\eta_0 + \eta_s}\right)\left(\frac{\eta_0 - \eta_s}{\eta_0 + \eta_s}\right)^* \tag{6}$$

where ∗ denotes complex conjugate.

22. The interferometric modulator according to claim 21, wherein assuming that the refractive index of a medium filling said gap formed between said stacked-layer film and said absorber layer is $\eta_v$, a physical distance of said gap is $\delta_v$, and D and E are given by the following expression (7), $$\begin{pmatrix} D \\ E \end{pmatrix} = \left\{ \prod_{j=1}^{M} \begin{pmatrix} \cos\delta_j & i \cdot \sin(\delta_j)/\eta_j \\ i \cdot \eta_j \cdot \sin(\delta_j) & \cos(\delta_j) \end{pmatrix} \right\} \begin{pmatrix} \cos\delta_v & i \cdot \sin(\delta_v)/\eta_v \\ i \cdot \eta_v \cdot \sin(\delta_v) & \cos(\delta_v) \end{pmatrix} \begin{pmatrix} 1 \\ \eta_s \end{pmatrix} \tag{7}$$

in a visible wavelength region of wide band, the following expression (8) is satisfied, $$\left(\frac{\eta_0 \cdot D - E}{\eta_0 \cdot D + E}\right)\left(\frac{\eta_0 \cdot D - E}{\eta_0 \cdot D + E}\right)^* > \left(\frac{\eta_0 - \eta_s}{\eta_0 + \eta_s}\right)\left(\frac{\eta_0 - \eta_s}{\eta_0 + \eta_s}\right)^* \tag{8}$$

where ∗ denotes complex conjugate.

23. The interferometric modulator according to claim 21, wherein said stacked-layer film has an alternate stacked-layer film in which a first transparent thin film layer and a second transparent thin film layer having mutually different complex indexes of refraction are stacked alternately, and a third transparent thin film layer provided on said alternate stacked-layer film and opposed to said absorber layer.

24. The interferometric modulator according to claim 21, wherein the distance of said gap formed between said stacked-layer film and said absorber layer is changed within an interferometric range.

25. The interferometric modulator according to claim 21, wherein the distance of said gap formed between said stacked-layer film and said absorber layer is changed up to the optical distance at which no interference occurs.

26. The interferometric modulator according to claim 21, wherein said gap formed between said stacked-layer film and said absorber layer is changed stepwise.

27. The interferometric modulator according to claim 21, further comprising a driving element for changing the distance of said gap formed between said stacked-layer film and said absorber layer.

28. The interferometric modulator according to claim 27, wherein said driving element comprises a piezoelectric element.

29. The interferometric modulator according to claim 21, wherein said gap formed between said stacked-layer film and said absorber layer is vacuum or filled with gas.

30. The interferometric modulator according to claim 21, wherein said gap formed between said stacked-layer film and said absorber layer is filled with liquid.

31. The interferometric modulator according to claim 21, further comprising a color filter disposed on the transparent substrate for passing light having a specific wavelength.

32. The interferometric modulator according to claim 21, further comprising a light scattering layer disposed on the transparent substrate.

33. The interferometric modulator according to claim 21, wherein said stacked-layer film comprises at least one transparent conductive layer.

34. The interferometric modulator according to claim 33, wherein the distance of said gap formed between said stacked-layer film and said absorber layer is changed in accordance with a voltage applied to said at least one transparent conductive layer.

35. A display unit having a plurality of pixels, each of which comprises the interferometric modulator according to claim 21.

36. The display unit according to claim 35, wherein said plurality of pixels comprise a first pixel and a second pixel, in which said interferometric modulators provided for said first pixel and said second pixel are mutually different in the configuration of said stacked-layer film or said absorber layer.

37. An electronic apparatus comprising the display unit according to claim 35.

* * * * *